United States Patent [19]
Kawaguchi et al.

[11] Patent Number: 5,110,280
[45] Date of Patent: May 5, 1992

[54] APPARATUS FOR FEEDING AND CUTTING SYNTHETIC RESIN

[75] Inventors: Kiyoshi Kawaguchi; Hideki Yagishi, both of Yokohama, Japan

[73] Assignee: Toyo Seikan Kaisha, Ltd., Tokyo, Japan

[21] Appl. No.: 444,693

[22] Filed: Dec. 1, 1989

Related U.S. Application Data

[60] Division of Ser. No. 266,230, Oct. 31, 1989, Pat. No. 4,913,871, which is a continuation of Ser. No. 874,948, Jun. 16, 1986, abandoned.

[30] Foreign Application Priority Data

Jun. 21, 1985 [JP] Japan .................. 60-133952
Aug. 30, 1985 [JP] Japan .................. 60-189362

[51] Int. Cl.$^5$ ........................... B29C 47/12
[52] U.S. Cl. ......................... 425/311; 425/295; 425/296; 425/305.1; 425/306; 264/142
[58] Field of Search ............ 425/308, 309, 310, 311, 425/306, 113, 114, 115, 130, 131.1, 133.1, 289, 292, 294, 295, 296, 297, 301, 305.1; 264/148, 142

[56] References Cited

U.S. PATENT DOCUMENTS

| | | | |
|---|---|---|---|
| 2,862,243 | 12/1958 | Farr | 264/142 |
| 2,900,668 | 8/1959 | Hubner | 264/142 |
| 3,025,564 | 3/1962 | Voight | 264/142 |
| 3,108,320 | 10/1963 | Daester | 264/142 |
| 3,608,035 | 9/1971 | Frohlich | 425/308 |
| 4,244,903 | 1/1981 | Schnause | 264/142 |
| 4,300,877 | 11/1981 | Andersen | 264/142 |
| 4,473,522 | 9/1984 | Marchesani | 264/148 |
| 4,537,737 | 8/1985 | Crowe | 264/148 |
| 4,569,810 | 2/1986 | Oriot | 264/142 |
| 4,678,423 | 7/1987 | Bertolotti | 264/142 |
| 4,728,275 | 3/1988 | DiLullo | 264/142 |
| 4,802,838 | 2/1989 | Schaaf | 264/142 |

*Primary Examiner*—Jay H. Woo
*Assistant Examiner*—Jeremiah F. Durkin, II
*Attorney, Agent, or Firm*—Beveridge, DeGrandi & Weilacher

[57] ABSTRACT

Disclosed is a synthetic resin feeding apparatus including an extruder having an extrusion plate with an extrusion opening formed therein and a cutting tool for cutting molten synthetic resin extruded from the extrusion opening. The extrusion plate is formed to have a tapered portion. The extrusion opening opens to the front end surface of the tapered portion.

10 Claims, 18 Drawing Sheets

FIG. 2
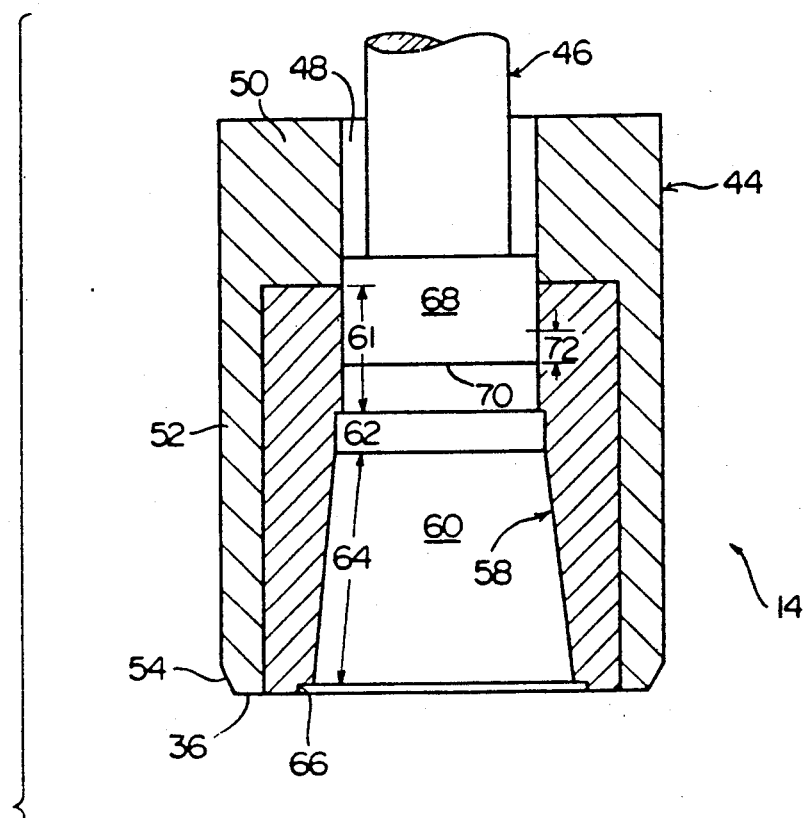
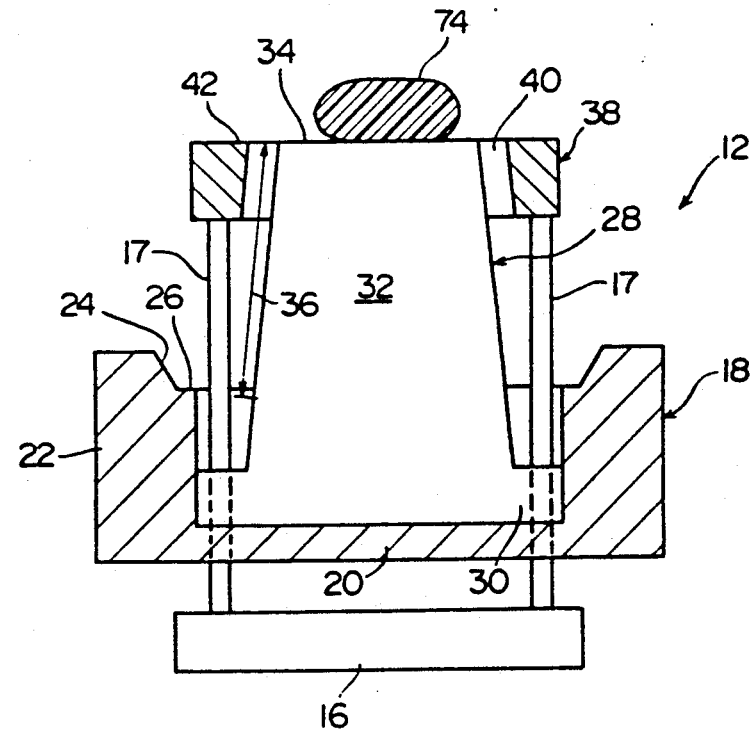

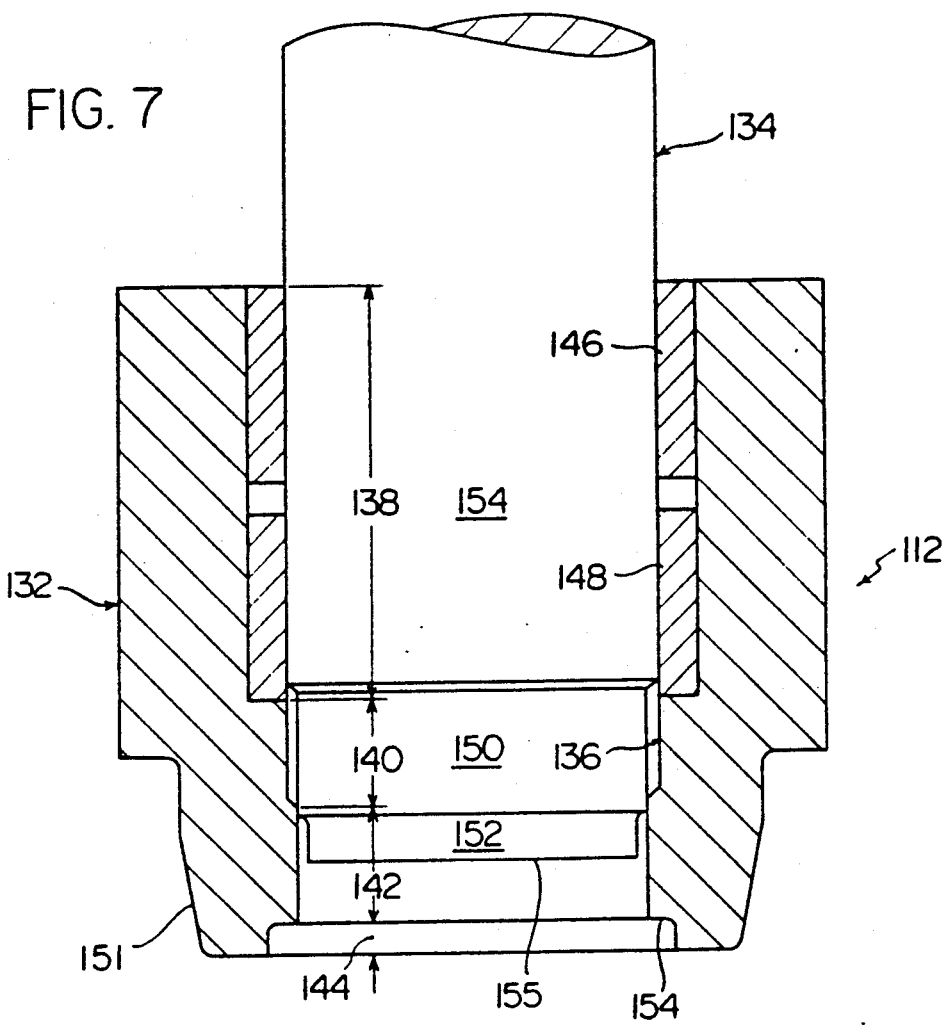
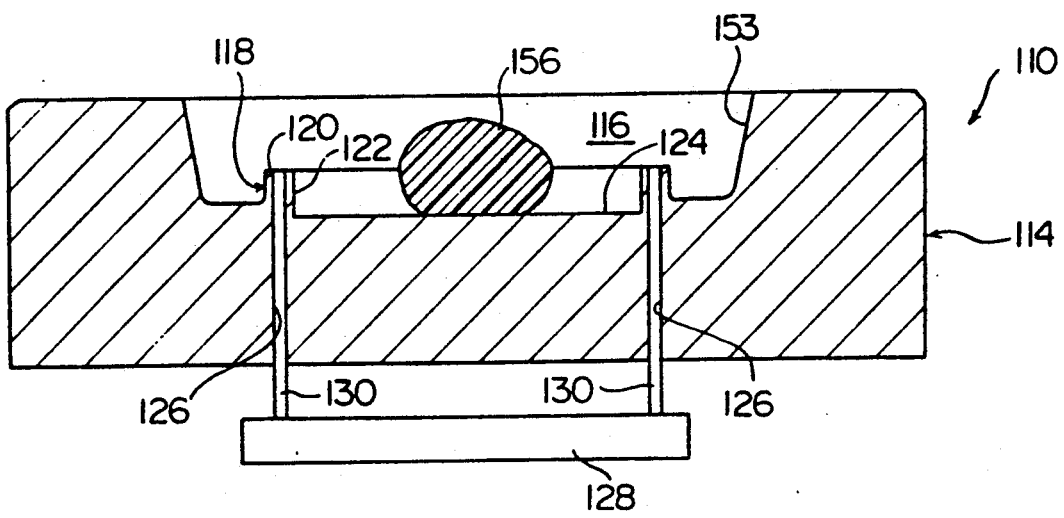
FIG. 7

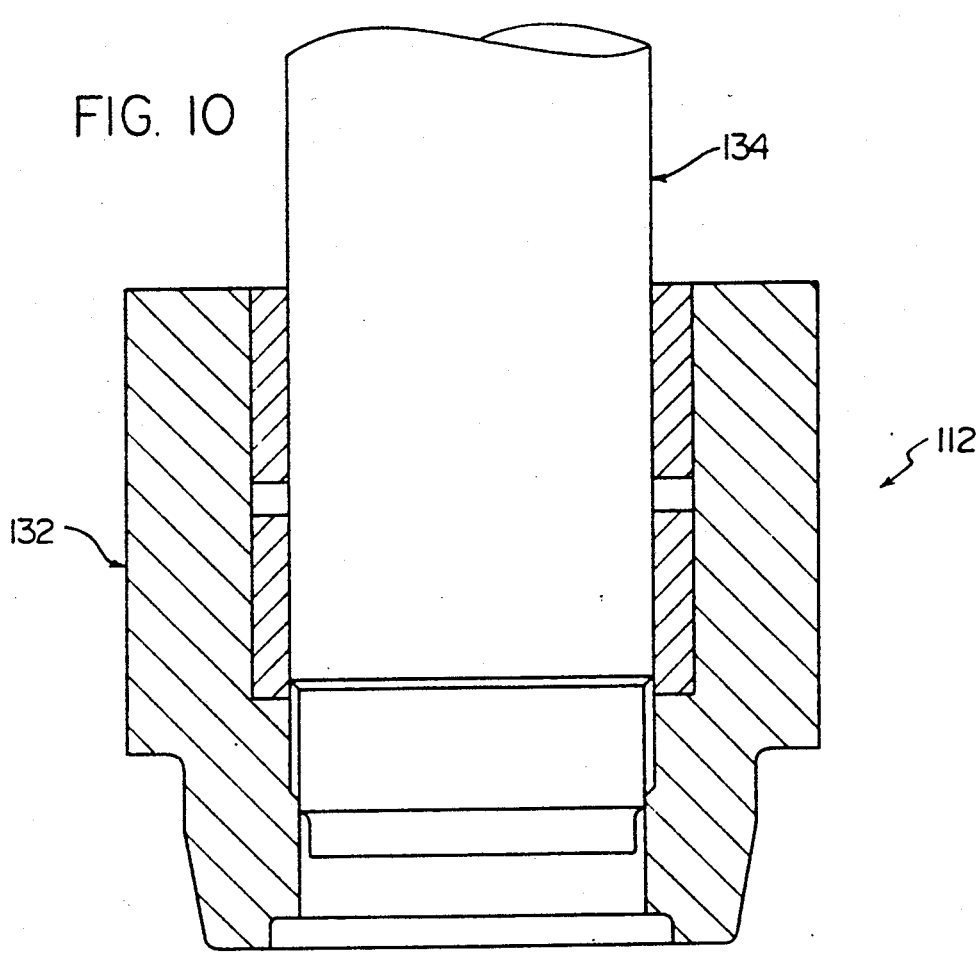
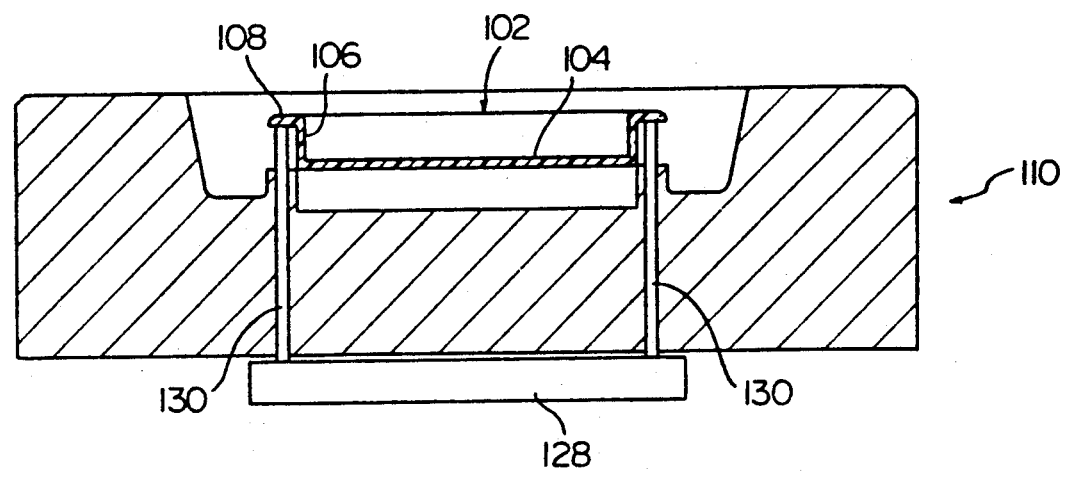
FIG. 10

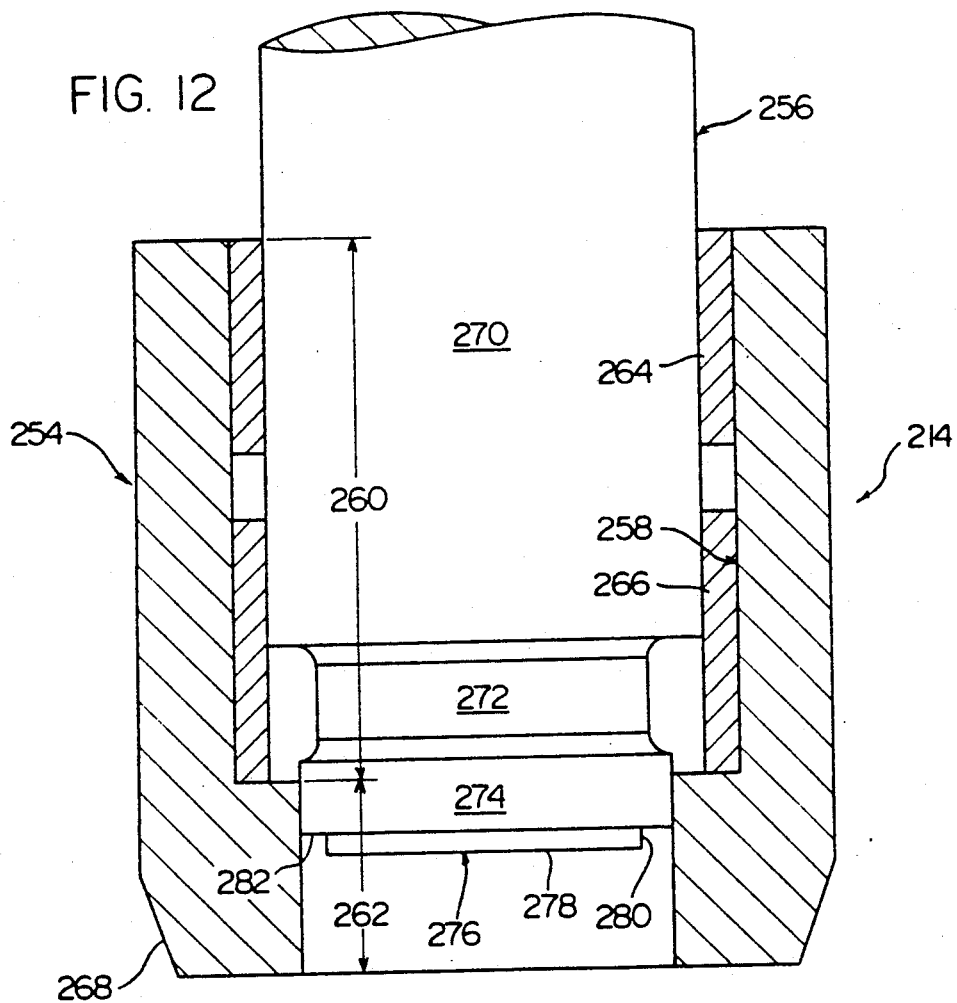
FIG. 12
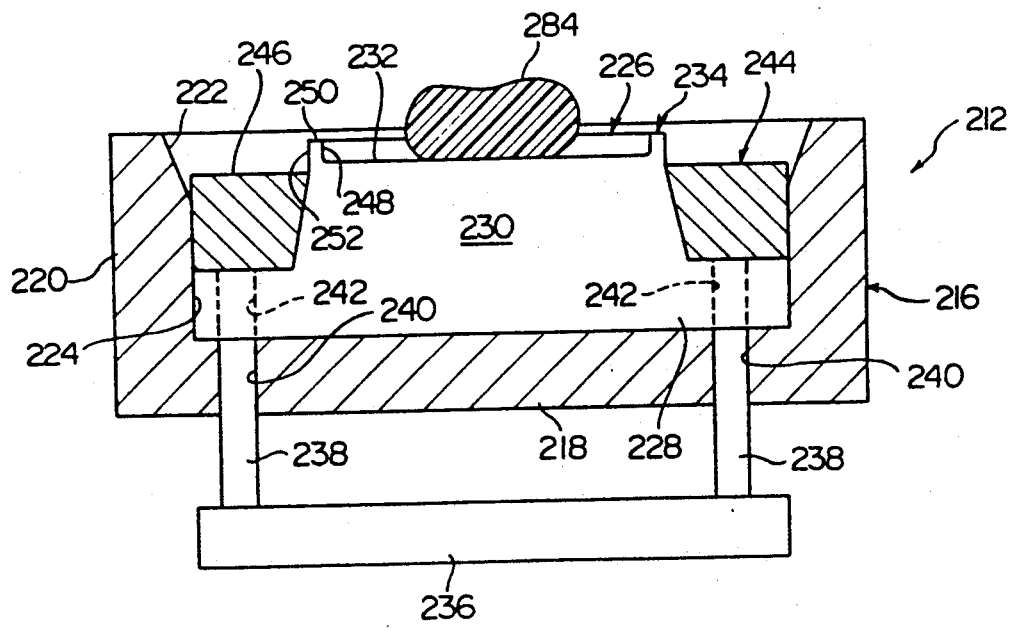

FIG. 15
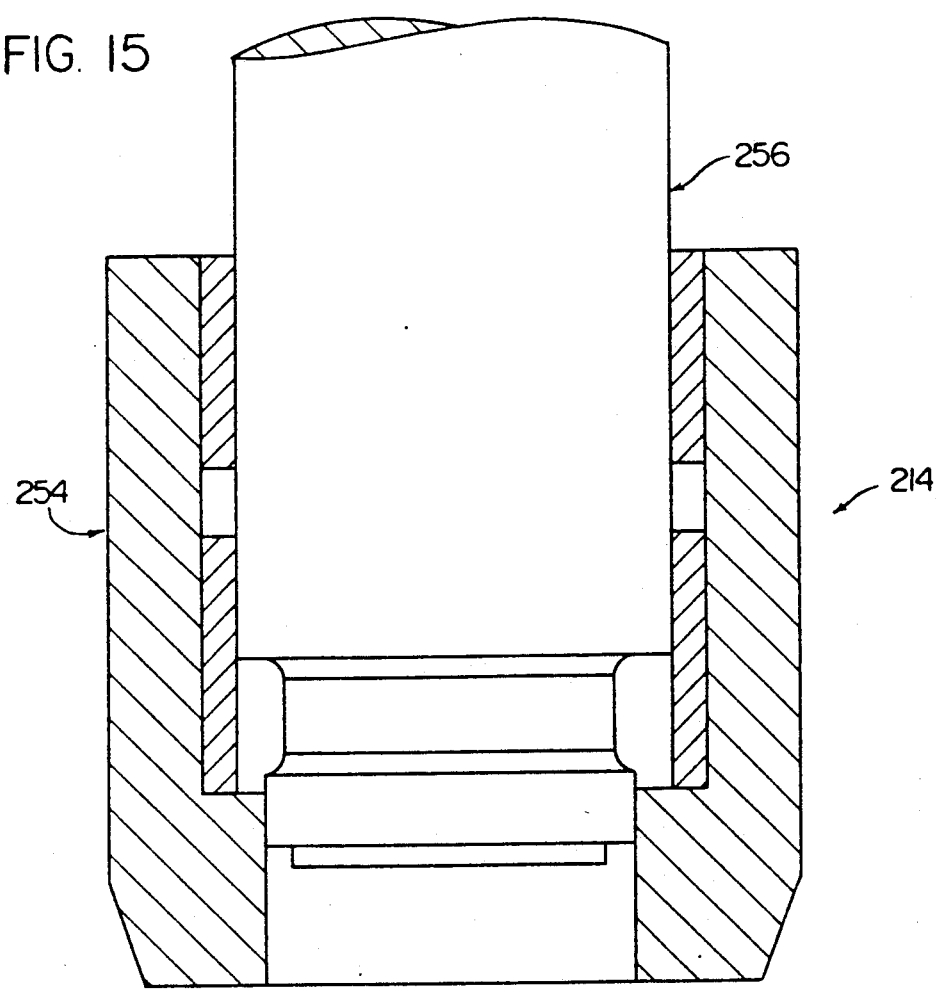
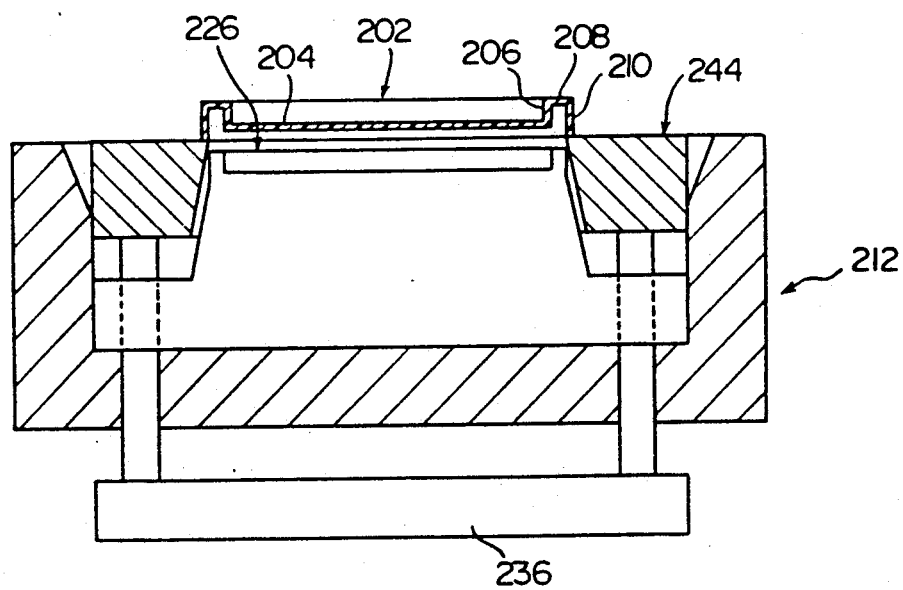

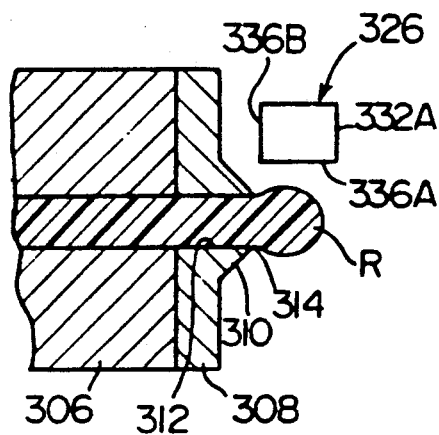
FIG. 18-A
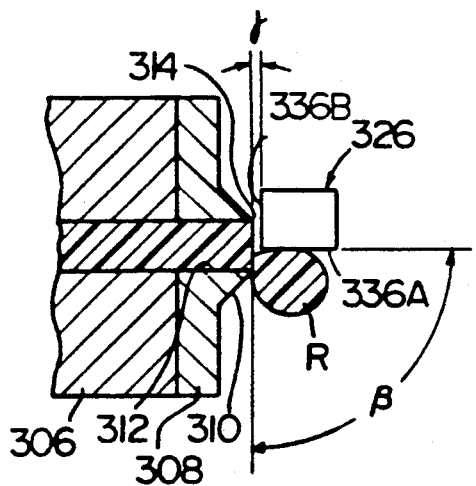
FIG. 18-B
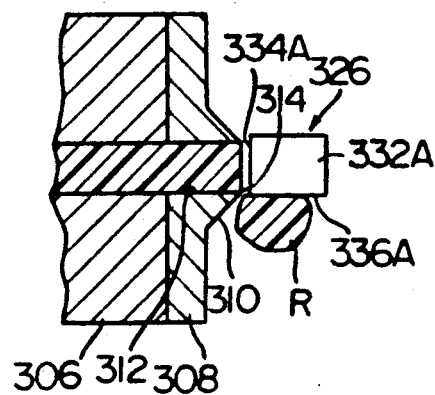
FIG. 18-C
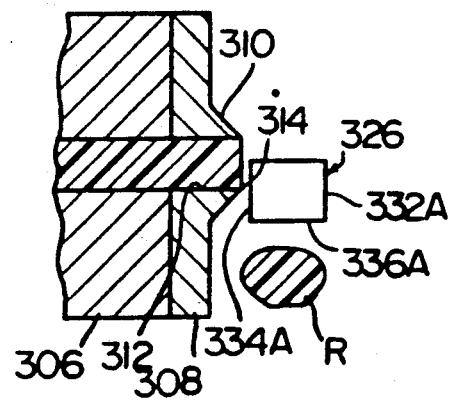
FIG. 18-D

APPARATUS FOR FEEDING AND CUTTING SYNTHETIC RESIN

This application is a division of application Ser. No. 07/266,230, filed Oct. 31, 1989, which is a continuation of application Ser. No. 06/874,948, filed Jun. 16, 1986, (now abandoned) and which has issued as U.S. Pat. No. 4,913,871 on Apr. 3, 1990.

BACKGROUND OF THE INVENTION

1. Field of the Invention

This invention relates to a compression molding method, and more specifically to a method of producing a molded article of a synthetic resin by compression molding a synthetic resin in the heat-melted state. The invention also pertains to an apparatus for feeding a synthetic resin which is used conveniently in the compression molding method, and more specifically, to an apparatus for feeding a synthetic resin comprising an extruder having an extrusion plate with an extrusion opening formed therein and a cutting tool for cutting a molten resin extruded from the extrusion opening.

2. Description of the Prior Art

Plastic containers for holding foods and drinks and plastic closures therefor have been in widespread used. Usually, plastic articles such as containers and container closures are produced by injection molding. The injection molding technique, however, has the following problems or defects as is well known in the art. Firstly, the injection molding has only a limited molding efficiency, and cannot achieve sufficient productivity. Secondly, orientation occurs in the synthetic resin material owing to its flowing during injection. As a result, the molded article does not have sufficient strength or toughness and may undergo breakage in the event of falling. This problem might be solved by increasing the wall thickness of the molded article, but this results in an increase in the amount of the synthetic resin material and therefore in an increase in the cost of production.

On the other hand, it has been proposed, and commercially accepted, to produce container closures of a relatively small size (for example, with an outside diameter of about 30 mm) by compression molding instead of injection molding and therefore to increase productivity. It has been considered to be extremely difficult, if not impossible, to produce molded articles of a relatively large size, for example, container closures with an outside diameter of at least 70 mm, because the synthetic resin material cannot be caused to flow in a required manner by compression, and even when the flowing of the synthetic resin can be effected in a required manner, defects such as creases occur in the peripheral edge portion of the molded article, particularly the outermost peripheral surface. Particularly, in containers having a considerably high side wall, it is necessary to make the thickness of the side wall sufficiently thin (for example, 0.5 mm or below) from the standpoint of cost. If an attempt is made to produce a container having such a side wall by compression molding, the synthetic resin material does not sufficiently flow into a mold space defining the side wall, and the side wall of the required height cannot be formed. The flowability of the synthetic resin material may be increased by selecting a synthetic resin material having a high melt flow index and increasing the compression pressure. However, this does not always lead to fully satisfactory flowability. In addition, higher melt flow indices of the synthetic resin material used generally result in lower strength or toughness. Increasing of the compression pressure, on the other hand, requires a molding apparatus of a larger size, and therefore, the equipment cost increases.

In compression molding, a predetermined amount of a synthetic resin in the heat-melted state is fed into an open mold. Then, the mold is closed under a predetermined pressure to mold the synthetic resin into an article. For feeding the predetermined amount of the synthetic resin into the open mold, there is generally used an apparatus of the type comprising an extruder having an extrusion plate with an extrusion opening formed therein and a cutting tool for cutting the molten synthetic resin extruded from the extrusion opening. The cutting tool is usually adapted to rotate or reciprocally pivot across the extrusion opening. This conventional synthetic resin feeding apparatus has the following problems to be solved.

The synthetic resin extruded from the extrusion opening has a relatively low melt flow index, a relatively low temperature, and a relatively high viscosity. When the amount of the synthetic resin extruded from the extrusion opening for cutting by the cutting tool is relatively small, the extruded synthetic resin is cut properly by the cutting tool, and then leaves the extrusion plate and the cutting tool and falls onto a given site. Experiments conducted by the present inventors, however, have shown that when the synthetic resin to be extruded from the extrusion opening has a relatively high melt flow index or a relatively high temperature and a relatively low viscosity, or when the amount of the synthetic resin extruded from the extrusion opening for cutting by the cutting tool is relatively large, the synthetic resin cut by the cutting tool in the conventional resin feeding apparatus tends to remain attached to the cutting tool and/or the extrusion plate and therefore, be unable to fall onto the given site.

SUMMARY OF THE INVENTION

It is a first object of this invention to provide a novel and excellent method which can give molded articles such as a container having a considerably high side wall and a container closure having a relatively large size, the production of which has been considered as extremely difficult if not impossible, without various problems, and can achieve increased productivity and an increase in the strength or toughness of the molded articles.

A second object of this invention is to provide an improved synthetic resin feeding apparatus which is suitable particularly when the molten resin to be extruded from an extrusion opening has a relatively high melt flow index or a relatively high temperature and a relatively low viscosity or when the amount of the molten resin extruded from the extrusion opening for cutting by a cutting tool is relatively large, and which properly cuts the molten resin extruded from the extrusion opening and causes it to fall accurately onto a given site without remaining attached to the cutting tool and/or the extrusion plate.

Another object of this invention is to provide an improved resin feeding apparatus by which the cut molten resin can be caused to fall not in a substantially vertical direction but in a forwardly inclined direction.

With regard to the first object of this invention, the present inventors have conducted extensive investigations and experiments on the flowing of a synthetic resin material in compression molding, and have found that in the compression molding of a synthetic resin material by the prior art, the whole of a male mold member defining the inside surface of a molded article to be produced and the whole of a female mold member defining the outside surface of the molded article are moved toward each other and therefore, the whole of the mold space including a portion defining the peripheral edge part of the molded article is gradually closed with the compression of the synthetic resin material, and that consequently, the flowing of the resin material into that part of the mold space which defines the peripheral edge part of the molded article is hampered and defects such as creases occur on the outermost peripheral surface of the molded article. They have recognized in particular that when the molded article is a container having a relatively high side wall extending upwardly in an outwardly inclined direction, that part of the mold space which defines the side wall of the container gradually decreases in thickness when gradually closed with the compression of the synthetic resin material, and that consequently, the flowing of the synthetic resin material into this part is markedly hampered. This recognition has led to the discovery that the aforesaid first object can be achieved by providing one of the female mold means and the male mold means with an outside member having a central opening and an inside member or plunger that is movable through the central opening relative to the outside member in such a manner that the outside member defines the peripheral edge portion of a molded article in cooperation with the other of the female mold means and the male mold means and the inside member defines the central portion of the molded article in cooperation with the other of the female mold means and the male mold means; performing a pre-mold-closing step of moving the outside member to a predetermined closed position toward the other of the female mold means and the male mold means; and thereafter performing a compression molding step of moving the inside member relatively to a predetermined closed position toward the other of the female mold means and the male mold means and thus compressing a synthetic resin material. It has thus been found that the use of such a unique compression-molding method enables the productivity of the method to be increased considerably in comparison with injection molding and the strength or toughness of the molded article to be increased; that the compression pressure can be made lower than the injection pressure in injection molding and therefore the equipment cost can be reduced; and that the melt flow index of the synthetic resin material used can be lowered in comparison with that in injection molding and because of this advantage, too, the strength or toughness of the molded article can be increased.

Thus, according to this invention, there is provided a method of producing a compression-molded article which comprises compression-molding a synthetic resin material in the heat-melted state by the cooperative action of a male mold means and a female mold means movable toward and away from each other; wherein one of the female mold means and the male mold means comprises an outside member having a central opening and an inside member movable relative to the outside member through the central opening, said outside member defining the peripheral edge portion of the molded article in cooperation with the other of the female mold means and the male mold means, and said inside member defining the central portion of the molded article in cooperation with the other of the female mold means and the male mold means, and said method comprises a pre-mold-closing step of moving the outside member and the other of the female mold means and the male mold means relative to each other to bring them into a predetermined mold-closed relationship and thereafter performing a compression molding step of moving the inside member relatively to a predetermined closed position toward the other of the female mold means and the male mold means and thus compressing the synthetic resin material.

When the molded article is a container comprising a bottom wall and a cylindrical side wall extending upwardly from the peripheral edge of the bottom wall, the male mold means preferably has a front end surface defining the inner surface of the bottom wall and an outside surface defining the inner surface of the side wall, and the female mold means preferably has the aforesaid outside member having an inside surface defining the outer surface of the side wall and the aforesaid inside member having a front end surface defining at least the central portion of the outer surface of the bottom wall.

With regard to the second object, the present inventors also conducted extensive investigations and experiments, and have found that the second object of this invention can be achieved by forming a tapered portion on the surface of an extrusion plate which in the conventional synthetic resin feeding apparatus, entirely has a substantially flat surface, and opening the front end surface of the tapered portion as an extrusion opening.

Thus, according to another aspect of this invention, there is provided a synthetic resin feeding apparatus comprising an extruder having an extrusion plate with an extrusion opening formed therein and a cutting tool for cutting a synthetic resin in the heat-melted state extruded from the extrusion opening, wherein the extrusion plate has formed therein a tapered portion and the extrusion opening is opened to the front end surface of the tapered portion.

In a preferred embodiment of this invention, the tapered portion is of a truncated cone having a tapering angle $\alpha$ of 60° to 100°, and the extrusion opening is opened over substantially the entire area of the front end surface of the tapered portion. Furthermore, the cutting tool is a rotary cutting tool having a rake angle $\beta$ of 80° to 145°, preferably about 100°, and the flank of the rotary cutting tool is spaced away from the front end surface of the tapered portion by some distance which may be about 0.5 to 1 mm. Moreover, the rotary cutting tool has a central axis of rotation inclined in a specific direction to the central axis of the opening end of the extrusion opening at an inclination angle of 20° to 40° so that it forces the cut molten resin forwardly from the front end surface of the tapered portion. Another preferred feature of the cutting tool is that it has a cavity through which a cooling medium is to be circulated.

BRIEF DESCRIPTION OF THE DRAWINGS

FIGS. 2 to 5 are simplified sectional views showing the principal parts of a compression-molding apparatus used to produce the plastic container shown in FIG. 1 by carrying out a preferred embodiment of the compression-molding method of this invention, and the operating sequence of the method.

FIGS. 7 to 10 are simplified sectional views showing the principal parts of a compression-molding apparatus used to produce the plastic container shown in FIG. 6 by carrying out a preferred embodiment of the compression-molding method of this invention, and the operating sequence of the method.

FIGS. 12 to 15 are simplified sectional views showing the principal parts of a compression-molding apparatus used to produce the plastic container closure shown in FIG. 11 by carrying out a preferred embodiment of the compression-molding method of this invention, and the operating sequence of the method.

FIG. 14 is a partial perspective view showing the principal parts of one embodiment of the synthetic resin feeding apparatus constructed in accordance with this invention.

FIGS. 18-A to 18-D are partial sectional views for illustrating the operation of the synthetic resin feeding apparatus of FIG. 16.

DETAILED DESCRIPTION OF PREFERRED EMBODIMENTS

The present invention will now be described in detail with reference to some preferred embodiments of the invention taken in conjunction with the accompanying drawings.

PRODUCTION OF CONTAINER BY COMPRESSION-MOLDING

Figure 1:
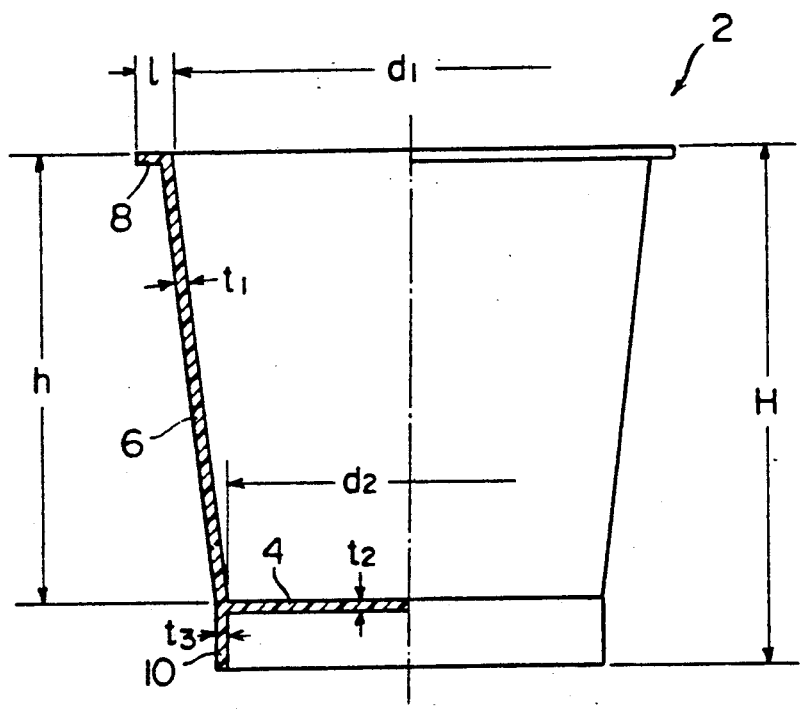
FIG. 1 is a side elevation, partly in section, showing one example of a plastic container formed by a preferred embodiment of the compression-molding method of this invention.

FIG. 1 shows one example of a plastic container to be produced by compression molding. A known container shown generally at 2, which may be made of a suitable synthetic resin such as polystyrene or polypropylene, has a bottom wall 4 and a side wall 6 extending upwardly from the peripheral edge of the bottom wall 4. The bottom wall 4 may be of any desired shape such as a polygon. The illustrated bottom wall 4 has a circular shape. The side wall 6 extends upwardly in an outwardly inclined direction. Since the bottom wall 4 is circular, the side wall 6 is correspondingly of a truncated cone. An annular flange 8 which extends outwardly substantially horizontally is formed at the upper end of the side wall 6. The illustrated container 2 further comprises a cylindrical leg 10 extending downwardly substantially vertically from the peripheral edge of the bottom wall 4. In use, an article such as yogurt is filled in a space defined by the bottom wall 4 and the side wall 6, and thereafter, a suitable closure (not shown) is fitted with the flange 8 to seal up the opening of the container at the upper end surface.

FIG. 2 shows one example of a compression-molding apparatus to be used to form the container 2 shown in FIG. 1 by compression molding in an inverted state (an upside-down state). The illustrated compression-molding apparatus includes a male mold means, i.e. a lower mold means, shown generally at 12 and a female mold means, i.e. an upper mold means, shown generally at 14.

The male mold means 12 includes a disc-like stationary supporting member 16 fixed to a suitable supporting frame (not shown), and a plurality of upwardly extending supporting posts 17 (two supporting posts alone are shown in FIG. 2) are fixed to the stationary supporting member 16 at intervals in the circumferential direction. A movable supporting member 18 is mounted on the supporting posts 17 so that it is free to ascend and descent substantially vertically. The movable supporting member 18 has a disc-like bottom portion 20 and a nearly cylindrical side portion 22 extending upwardly from the peripheral edge of the bottom portion 20. On the inner circumferential portion at the upper end of the side portion 22, an inverted truncated conical surface 24 inclined inwardly in the downward direction and an annular horizontal surface 26 located inwardly of the inverted truncated conical surface 24 are formed. A main member 28 is fixed to the bottom portion 20 of the movable supporting member 18. The main member 28 has a truncated conical portion 32 extending upwardly from its bottom portion 30 fixed to the movable supporting member 18. As will be clear from the description given hereinafter, the substantially horizontal upper end surface 34 of the truncated conical portion 32 of the main member 28 defines the entire inner surface of the bottom wall 4 of the container 2, and a part 36 of the peripheral surface (i.e. the part excepting the lower part of the peripheral surface) of the truncated conical portion 32 of the main member 28 defines the entire inner surface of the side wall 6 of the container 2. The movable supporting member 18 is connected to a suitable elevating and lowering mechanism (not shown), and the movable supporting member 18 and the main member 28 fixed to it are elevated or lowered in a manner to be described hereinafter. An auxiliary member 38 is fixed to the upper end of the supporting posts 17. The auxiliary member 38 has a truncated conical centrally extending opening 40 having a relatively large diameter, and the main member 28 is elevated or lowered through the centrally extending opening 40. When the main member is elevated to the uppermost position, the lower portion of the peripheral surface of the truncated conical portion 32 of the main member 28 is brought into intimate contact with the inner circumferential surface of the auxiliary member 38 (see FIGS. 3 and 4 also). As will be made clear hereinafter, the inner circumferential edge portion 42 of the substantially horizontal upper end surface of the auxiliary member 38 defines the upper surface of the flange 8 of the container 2.

The female mold means 14 has a first movable supporting member 44 and a second movable supporting member 46. The first movable supporting member 44 has a disc-like base portion having a circular through-opening 48 at its central part and a cylindrical portion 52 extending downwardly from the peripheral edge part of the base portion 50. On the lower end of the cylindrical portion 52, an inverted truncated conical surface 54 (which corresponds to the inverted truncated conical surface of the movable supporting member 18 in the male mold means) and an annular horizontal surface 56 located inwardly of the inverted truncated conical surface 54. The second movable supporting member 46 is cylindrical, and its lower portion is located within the circular through opening 48 of the first movable supporting member 44. The outside member 58 is nearly cylindrical and has a through-opening 60 at its central part. The upper portion 61 of the inner circumferential surface of the outside member 58 is cylindrical, and an intermediate portion 62 following the upper portion 61 is cylindrical with a little bit larger diameter than the upper portion 61. A lower portion 64 is truncated-conical. As will be stated hereinafter, the intermediate portion 62 defines the entire outside surface of the leg 10 of the container 2, and the lower portion 64 of the inner circumferential surface of the outside member 58 defines the entire outer surface of the side wall 6 of the container. The lower end of the outside member 58 defines substantially the same plane as the annular horizontal surface of the first movable supporting member 44. An annular depression 66 having some depth is formed in the inner circumferential edge portion of the lower end of the outside member 58. As will be stated in detail hereinafter, the bottom surface of the annular depression 66 defines the lower surface of the flange 8 of the container. A cylindrical inside member or plunger 68 is fixed to the lower end of the second movable supporting member 46. The outside diameter of the inside member 68 is substantially equal to the inside diameter of the upper portion 62 of the inner circumferential surface of the outside member 58. The substantially horizontal front end surface (i.e. the lower end surface) 70 of the inside member 68 defines the entire outer surface of the bottom wall 4 of the container as will be made clear hereinafter. Furthermore, the lower portion 72 of the outer circumferential surface of the inside member 48 defines the entire inner surface of the leg 10 of the container as will be made clear from the description given hereinafter. If desired, particularly when a container having no leg 10 is to be formed, it is possible to define only the central portion of the outside surface of the bottom wall 4 of the container 2 by the front end surface 70 of the inside member 68, form a downwardly facing shoulder portion on the inner circumferential surface of the outside member, and to define the peripheral edge portion of the outer surface of the bottom wall 4 of the container 2 by the shoulder portion. The first movable supporting member 44 is connected to a suitable elevating and lower mechanism (not shown), and the first movable supporting member 44 and the outside member 58 fixed to it are elevated and lowered substantially vertically as will be described hereinafter. The second movable supporting member 46 is connected to a suitable elevating and lowering mechanism (not shown) independently from the first movable supporting member 44, and the second movable supporting member 46 and the inside member 68 fixed to it are elevated and lowered substantially vertically as will be described hereinafter independently of the first movable supporting member 44 and the outside member 58 fixed to it. When the inside member 68 is elevated or lowered relative to the outside member 58, the inside member ascends and descends relatively through the opening 60 of the outside member 58.

Now, the method of producing the container 2 shown in FIG. 1 by compression molding in a compression molding apparatus having the male mold means 12 and the female mold means 14 described hereinafter will be described.

Before the starting of compression molding, the male mold means 12 and the female mold means 14 are positioned in the state shown in FIG. 2. Preferably, prior to the starting of compression molding, the main member 28 and the auxiliary member 38 in the male mold means 12 and the outside member 58 and the inside member 68 in the female mold means 14 are heated by a suitable method, for example, by circulating a heating medium through a circulating passage (not shown) formed in these members 28, 38, 58 and 68 so that the temperatures of the mold space defining surfaces of these members 28, 38, 58 and 68 are adjusted to about 40° to 60° C. (This heating may be carried out only before the first starting of the compression-molding process, and when the compression-molding process is repeatedly carried out, the members 28, 38, 58 and 68 are already at the required temperature when the previous compression-molding cycle is over.)

Thereafter, a predetermined amount of a synthetic resin material 74 in the heat-melted state is fed onto the upper end surface 34 of the main member 38 of the male mold means 12. The feeding of the synthetic resin material can be conveniently carried out by the synthetic resin feeding apparatus to be described in detail hereinafter.

Figure 3:
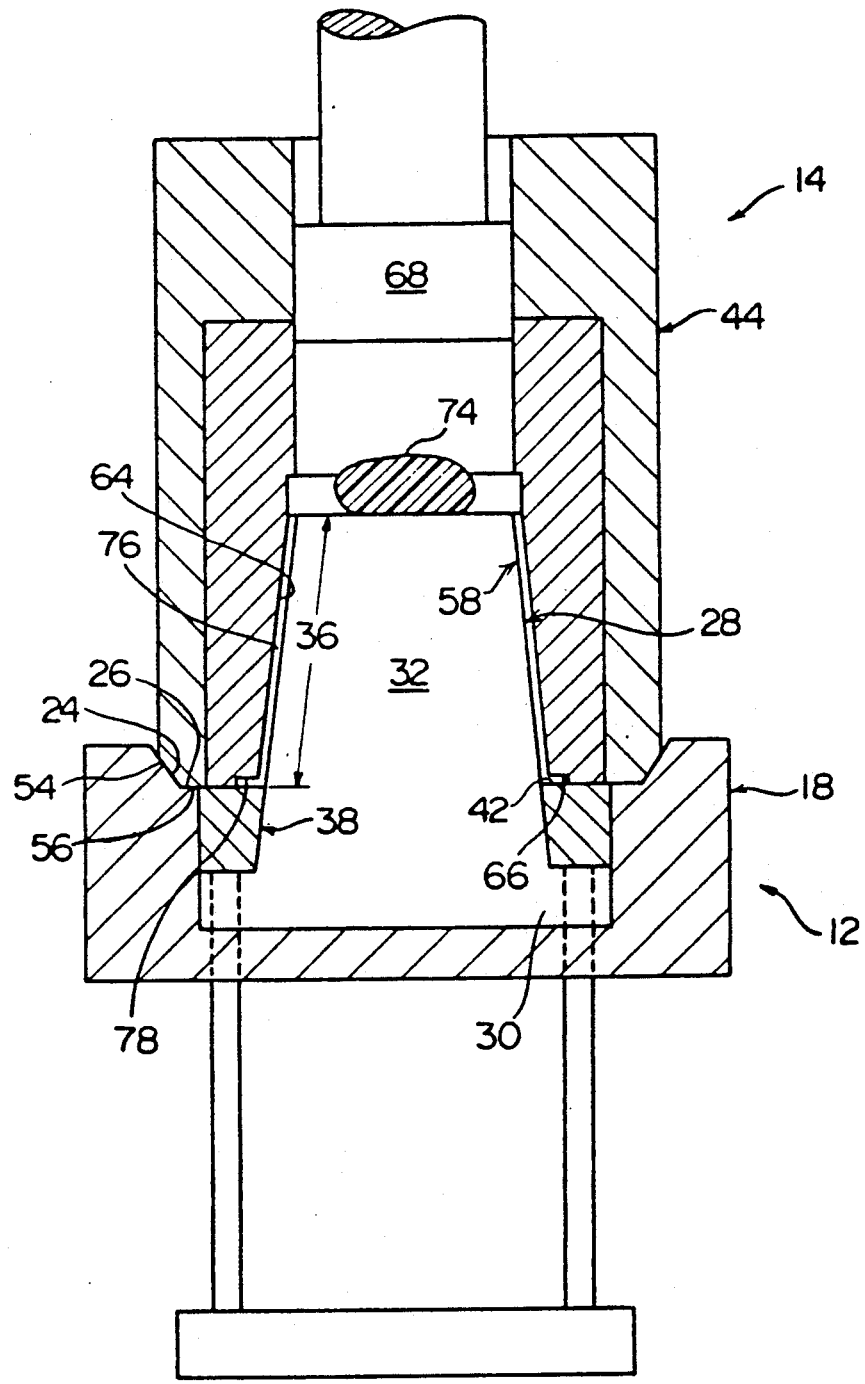

In the next place, a pre-mold-closing step of maintaining the male mold means 12 and the female mold means 14 in the state shown in FIG. 3 is carried out. Specifically, the main member 28 in the male mold means 12 is elevated to the upper limit position shown in FIG. 3 at which the bottom portion 30 of the main member 28 abuts against the lower surface of the auxiliary member 38 and the lower portion of the outer circumferential surface of the truncated conical portion 32 of the main member 28 abuts against the inner circumferential surface of the auxiliary member 38 whereby further elevation of the main member 28 is hampered. At the same time, the outside member 58 in the female mold means 14 is lowered to a closed position shown in FIG. 3. At the closed position, the lower end surface of the outside member 58 abuts against the upper end surface of the auxiliary member 38 in the male mold means 12 and the inverted truncated conical surface 54 and the annular horizontal surface 56 formed in the lower end of the first movable supporting member 44 abut against the inverted truncated conical surface 24 and the annular horizontal surface 26 formed on the upper end of the movable supporting member 18 in the male mold means 12 and the peripheral edge portion of the upper surface of the auxiliary member 38. As a result, the outside member 58 in the female mold means 14 is positioned in a given mold-closed relationship with respect to the main member 28 and the auxiliary member 38 in the male mold means 12. It will be easily understood from FIG. 3 that when this mold-closed relationship is created, a portion 76 of the mold space defining the side wall 6 of the container 2 is formed by the outer circumferential surface of the truncated conical portion 32 of the main member 28 in the male mold means 12 and the truncated conical inner circumferential surface 64 at the lower portion of the outside member 58 in the female mold means 14, and a portion 78 of the mold space defining the flange 8 of the container 2 is formed by the inner circumferential portion 42 of the upper end surface of the auxiliary member 38 in the male mold means 12 and the annular depression 66 formed in the lower end surface of the outside member 58 in the female mold means 14. Preferably, the mold closing pressure between the main member 28 and the auxiliary member 38 in the male mold means and the outside member 58 in the female mold means 14 is slightly higher than the compressing pressure to be described.

As can be seen from a comparison of FIG. 2 with FIG. 3, in the pre-mold-closing step in the illustrated embodiment, the inside member 68 in the female mold means 14 is also lowered. It is critical however that the inside member 68 should not be lowered to a position where it exerts a substantial compressing action on the synthetic resin material 74. In other words, it is important that no substantial compression action should be exerted on the synthetic resin material 74 by the inside member 68 before the operation of maintaining the outside member 58 in the female mold means 14 in a given mold-closed relationship with respect to the main member 28 and the auxiliary member 38 is completed.

In the illustrated embodiment, the synthetic resin material 74 is fed to the upper end surface of the main member 28 in the male mold means 12 (FIG. 2, and thereafter, the pre-mold-closing step is performed (FIG. 3). If desired, the synthetic resin material 74 may be fed after the pre-mold-closing step has been performed.

Figure 4:
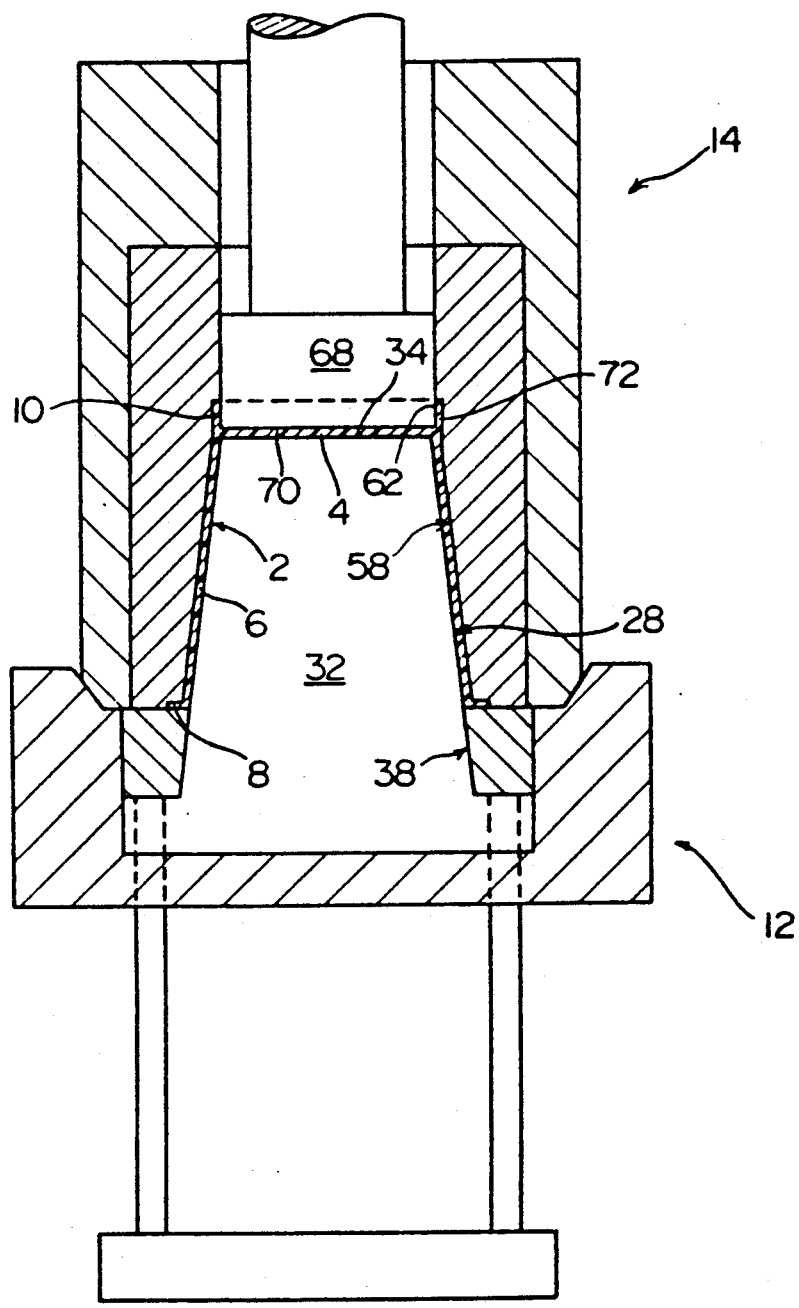

Then, the compression molding step is carried out. Specifically, as shown in FIG. 4, the inside member 68 in the female mold means 14 is lowered under a predetermined compressing pressure to compression-mold the synthetic resin material 74. As a result, the synthetic resin material 74 flows into the portions 76 and 78 of the mold space (FIG. 3) to form the side wall 6 and the flange 8 of the container 2, and at the same time, the bottom wall 4 of the container 2 is formed by a mold space portion defined between the upper end surface of the main member 28 in the male mold means 12 and the lower end surface 70 of the inside member 68 in the female mold means 14. Furthermore, the synthetic resin material 74 also flows into a mold space portion defined by the lower portion 72 of the outer circumferential surface of the inside member 68 in the female mold means 14 and the intermediate portion 62 of the inner circumferential surface of the outside member 58 in the female mold means 14 to form the leg 10 of the container 2. Thus, the container 2 shown in FIG. 1 is formed in an upside-down state.

Experiments of the present inventors have surprisingly shown that if the pre-mold-closing step is carried out (FIG. 3) first and then the compression molding step (FIG. 4) is performed, the synthetic resin material 64 can be caused to flow well also into the portion 76 (FIG. 3) of the mold space defining the side wall 6 of the container 2 and the portion 78 (FIG. 3) of the mold space defining the flange 8 of the container 2, and the container 2 can be formed by compression molding very easily and stably. It has also been confirmed that the compressing pressure required for the sufficiently good flowing of the synthetic resin material 74 is much lower than the required injection pressure (for example, 1400 to 1500 kg/cm$^2$) in injection molding, and may sufficiently be about 500 kg/cm$^2$. It has further been confirmed by the present inventors that the synthetic resin material 74 may be caused to flow very well even when its melt flow index is much smaller than that required (for example, 18 to 20) in injection molding, namely about 0.1.

The following fact should also be noted in regard to the pre-mold-closing step shown in FIG. 3 and the compression molding step shown in FIG. 4. It is extremely difficult in practice, if not impossible, to control the amount of the feed synthetic resin material 74 very accurately, and the amount of the resin material 74 varies within a certain range. When the pre-mold-closing step (FIG. 3) is first carried out and then the compression molding step (FIG. 3) is carried out under a predetermined compressing pressure as stated above, the amount of the synthetic resin material 74 fed determines the lowered position of the inside member 68 in the female mold means 14 at the final point of the compression molding step, as can be easily seen from a comparison of FIG. 3 with FIG. 4. Hence, even when the amount of the feed synthetic resin material 74 varies, the total height H, effective height h and inner capacity of the container 2, which are important dimensional factors, are maintained always constant, and the variations in the amount of the feed synthetic resin material 74 are compensated by variations in the thickness $t_2$ of the bottom wall 4 (see FIG. 1 also).

In the compression molding step in the illustrated embodiment, the inside member 68 in the female mold means 14 is lowered (moved toward the male mold means 12) while the main member 28 and the auxiliary member 38 in the male mold means 12 and the outside member 58 in the female mold means 14 are maintained stationary at given positions. If desired, in addition to, or in place of, lowering the inside member 68, it is possible to elevate the main member 28 and the auxiliary member 38 in the male mold means 12 and the outside member 58 in the female mold means 14 as a unit.

Then, the male mold means 12 and the female mold means 14 are maintained in the state shown in FIG. 4, and the molded container 2 and the main member 28 and the auxiliary member 38 in the male mold means 12 and the outside member 58 and the inside member 68 in the female mold means 14 are cooled to adjust the temperatures of the mold space defining surfaces of the members 28, 38, 58 and 68 to, for example, 40° to 60° C. In order to shorten the time required for cooling and increase the production efficiency, it is convenient to circulate a cooling medium such as cooling water through the circulating passage (not shown) formed in the members 28, 38, 58 and 68.

Figure 5:
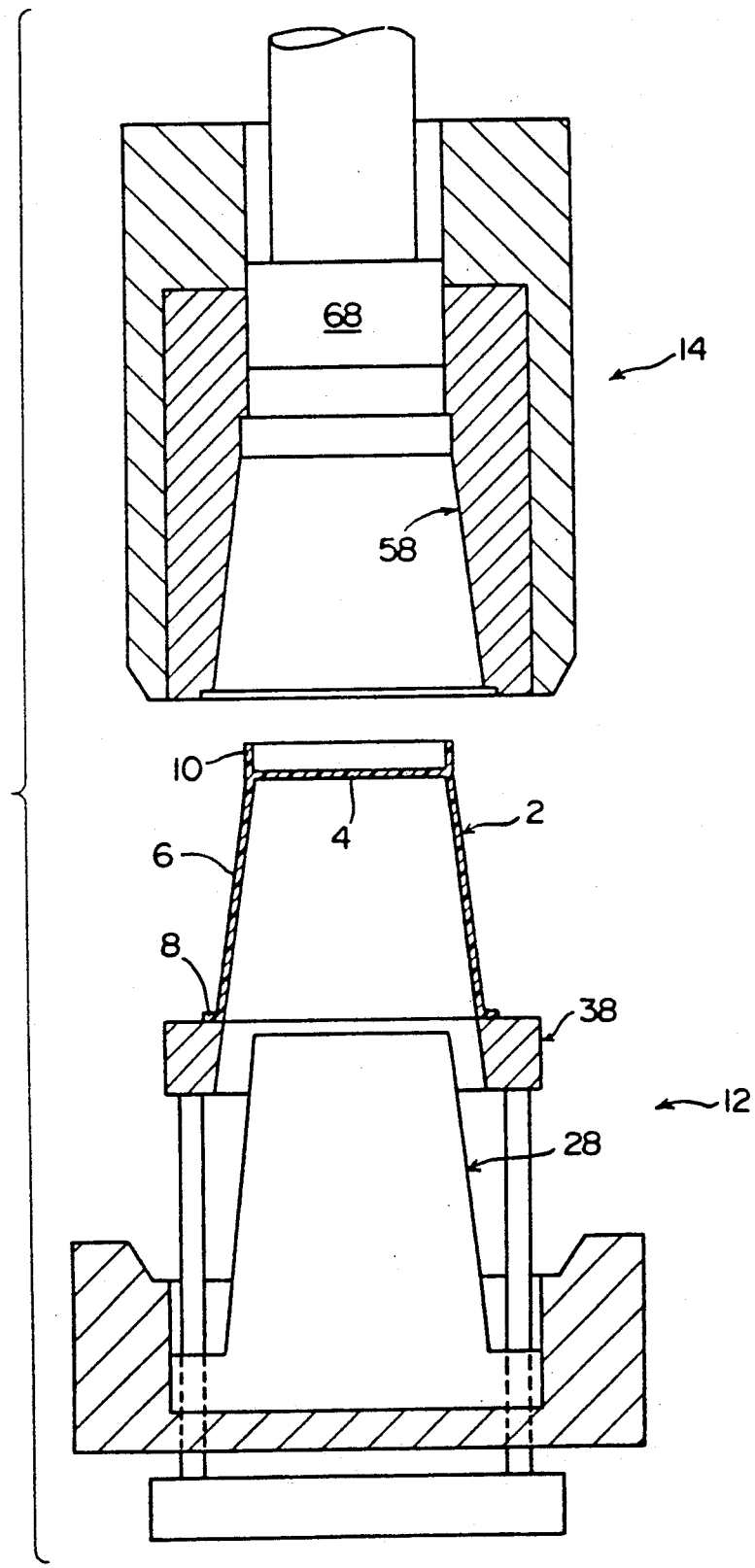

Thereafter, the male mold means 12 and the female mold means 14 are opened, and the container 2 is taken out. With reference to FIG. 5 in conjunction with FIG. 4, in the step of taking out the container 2, the outside member 58 and the inside member 68 in the female mold means 14 are elevated by a suitable procedure and separated from the molded container 2. The main member 28 in the male mold means 12 is lowered and separated from the molded container 2. As a result, as shown in FIG. 5, only the flange 8 of the molded container 2 remains supported on the upper surface of the auxiliary member 38 in the male mold means 12. Hence, the molded container 2 can be taken out by a suitable discharge mechanism (not shown).

EXAMPLE A-1

Plastic containers were produced by compression molding in the same compression molding apparatus as described above with reference to FIG. 2 by the procedure described above with reference to FIGS. 1 to 5. Polystyrene (tradename "Styron H8175", sold by Asahi Chemical Industry Co., Ltd.) having a melt flow index of 18 was used as a starting synthetic resin material. The temperature of the resin material fed to the compression molding apparatus was 235° C., and the compressing pressure in the compression molding step was 500 kg/cm².

As a result, containers having the configuration shown in FIG. 1 could be obtained by compression molding. The containers had the following dimensions (see FIG. 1 also).

Total height H: 67 mm.
Effective height h: 58 mm.
Inside diameter $d_1$ of the upper end of the side wall: 64 mm.
Inside diameter $d_2$ of the lower end of the side wall: 50 mm.
Amount of projection of the flange: 3.5 mm.
Thickness $t_1$ of the side wall and the flange: 0.45 mm.
Thickness $t_2$ of the bottom wall: 0.55 mm.
Thickness $t_3$ of the leg: 0.65 mm.

To test the strength or toughness of the containers, 130 cc of water was filled into each of the containers, and then, the containers were sealed up by hot-bonding a closure composed of a laminated material of an aluminum foil having a thickness of 70 micrometers and an ethylene/vinyl alcohol copolymer resin coat to the flange of each container. The containers were left to stand at 5° C. for 5 hours. Five such container samples were let fall onto a concrete floor from each of various heights, and the number of the containers that broke was counted. The results are shown in Table 1 below.

EXAMPLE A-2

Plastic containers were produced by compression molding in the same way as in Example A-1 except that polystyrene (tradename "Styron 475D", sold by Asahi Chemical Industry Co., Ltd.) having a melt flow index of 2.8 was used as the synthetic resin material.

The containers had the configuration shown in FIG. 1, and the same dimensions as shown in Example A-1.

The containers were subjected to the same strength or toughness test as in Example 1, and the results are shown in Table 1.

COMPARATIVE EXAMPLE A

For comparison, containers having the same configuration and the same dimensions as shown in Example A-1 were produced from the same synthetic resin material as used in Example A-1 by injection molding under an injection pressure of 1450 kg/cm².

The containers were subjected to the same strength or toughness test as in Example A-1, and the results are shown in Table 1.

TABLE 1

| Falling height (cm) | Number of the containers that broke (n/5) | | |
|---|---|---|---|
| | Example A-1 | Example A-2 | Comparative Example A |
| 100 | 0 | 0 | 0 |
| 110 | 0 | 0 | 0 |
| 120 | 0 | 0 | 1 |
| 130 | 1 | 0 | 2 |
| 140 | 2 | 1 | 5 |

PRODUCTION OF CONTAINER CLOSURE I BY COMPRESSION MOLDING

Figure 6:
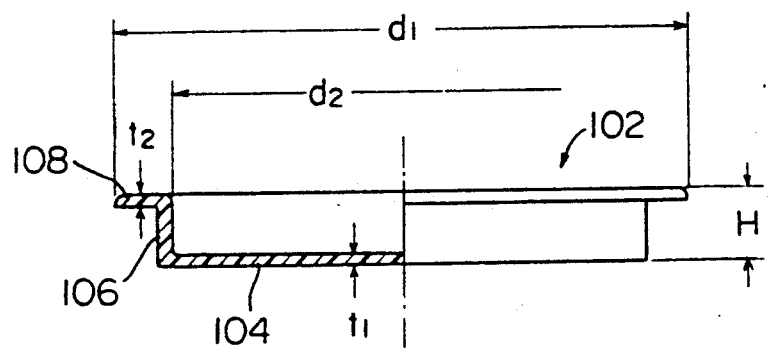
FIG. 6 is a side elevation, partly in section, of an example of a plastic container closure produced by a preferred embodiment of the compression-molding method of this invention.

FIG. 6 illustrates one example of a plastic container closure to be produced by compression molding. A known container closure shown generally at 102, which may be made of a suitable synthetic resin such as polyethylene or polyethylene terephthalate, has a circular top panel wall 104, a cylindrical rising wall 106 extending upwardly from the peripheral edge of the top panel wall 104, and a flange 108 extending outwardly from the upper end of the rising wall 106.

FIG. 7 shows one example of a compression molding apparatus used to produce the container closure 102 ilustrated in FIG. 6. The illustrated compression molding apparatus includes a female mold means, i.e. a lower mold means, shown generally at 110 and a male mold means, i.e. an upper mold means, shown generally at 112.

The female mold means 110 comprises a stationary member 114 fixed to a suitable supporting frame (not shown). A nearly truncated conical depression 116 is formed on the upper surface of the stationary member 114. An annular protrusion 118 is formed on the bottom surface of the depression 116. As will be made clear hereinafter, the substantially horizontal upper end surface 120 of the annular protrusion 118 defines the under surface of the flange 108 of the container closure 102; the substantially vertical inner surface 122 of the annular protrusion 118 defines the outside surface of the rising wall 106; and that portion 124 of the bottom surface of the depression 116 which is located inwardly of the annular protrusion 118 defines the under surface of the top wall 104 of the closure 102. A plurality of through-holes 126 (only two of which are shown in FIG. 7) disposed at circumferentially spaced intervals and extending substantially vertically are formed on the stationary member 114. The radial positions of the through-holes 126 are in alignment with the annular protrusion 118, and the upper end of each of the through-holes 126 is opened to the upper end surface 120 of the annular protrusion 118. The female mold means 110 also includes a movable member 128 disposed beneath the stationary member 114. The movable member 128 is mounted so as to be free to ascend and descend substantially vertically, and is elevated or lowered by a suitable elevating-lowering mechanism (not shown). A plurality of upstanding pins 130 (only two of which are shown in FIG. 7) inserted respectively in the through-holes 126 are implanted in the movable member 128. When the movable member 128 is held at a lowered position shown in FIG. 7, the upper end surfaces of the pins 130 are continuous to the upper end surface of the annular protrusion 118.

The male mold means 112 includes a movable outside member 132 and a movable inside member 134. The outside member 132 is nearly cylindrical, and a circular through-opening 136 is formed centrally therein. The upper portion 138 of the opening 136 has a relatively large diameter, and its intermediate portion 140 has a smaller diameter than the upper portion 138. Its lower portion 142 has a slightly smaller diameter than the intermediate portion 140. Its lower end portion 144 has a slightly larger diameter than the lower portion 142. The upper portion 138 has fixed thereto bearing sleeves 146 and 148 which have substantially the same inside diameter as the inside diameter of the intermediate portion 140. The lower portion 151 of the outer circumferential surface of the outside member 132 is slightly tapered downwardly. The tapered lower portion 151 of the outside member 132 corresponds to the circumferential surface 153 of the depression 116 of the stationary member 114. The inside member 134 is nearly cylindrical, and a first small-diameter portion 150 and a second small-diameter portion 152 are formed in its lower portion. The upper portion 154 of the inside member 134 has substantially the same outside diameter as the inside diameter of each of the bearing sleeves 146 and 148 in the outside member 132. The outside diameter of the first small-diameter portion 150 of the inside member 134 is substantially the same as the inside diameter of the lower portion 142 of the through-opening 136 in the outside member 132. The outside diameter of the second small-diameter portion 152 is slightly smaller than the outside diameter of the first small-diameter portion. The outside member 132 is mounted so as to be free to ascend and descend substantially vertically, and is elevated or lowered by a suitable elevating-lower mechanism (not shown). The inside member 134 is also mounted so as to be free to ascend and descend substantially vertically, and is elevated or lowered by a suitable elevating-lowering mechanism (not shown) through the opening 136 in the outside member 132 independently of the outside member 132. As will be made clear from the description given hereinbelow, the substantially horizontal lower end surface 155 of the inside member 134 defines the upper surface of the top wall 104 of the closure 102; the outer circumferential surface of the second small-diameter portion 152 of the inside member 134 defines the inner surface of the rising wall 106 of the closure 102; and the shoulder surface 154 between the lower portion 142 and the lower end portion 144 of the opening 136 in the outside member defines the upper surface of the flange 108 of the closure 102.

The closure 102 shown in FIG. 6 may be produced by compression molding in the compression molding apparatus including the aforesaid female mold means 110 and male mold means 112 in accordance with the following procedure.

The female mold means 110 and the male mold means 112 are positioned in the state shown in FIG. 7 before the starting of compression molding. Preferably, prior to the starting of compression molding, the stationary member 114 in the female mold means 110 and the outside member 132 and the inside member 132 in the male mold means 112 are heated or cooled by a suitable method, for example by circulating a heating or cooling medium through a circulating passage (not shown) formed in these members 114, 132 and 134 so that the temperatures of the mold space defining surfaces of these members 114, 132 and 134 are adjusted to about 20° to 45° C. (the heating or cooling may be done only before the starting of the first compression molding cycle, and as will be clear from the description given hereinafter, the members 114, 132 and 134 already attain the required temperature upon the termination of the previous molding cycle).

Thereafter, a predetermined amount of a synthetic resin material 156 in the heat-melted state is fed into the central part of the depression 116 of the stationary member 114 in the female mold means 110. The feeding of the synthetic resin material 156 can be conveniently carried out by the synthetic resin feed apparatus to be described in detail hereinafter.

Figure 8:
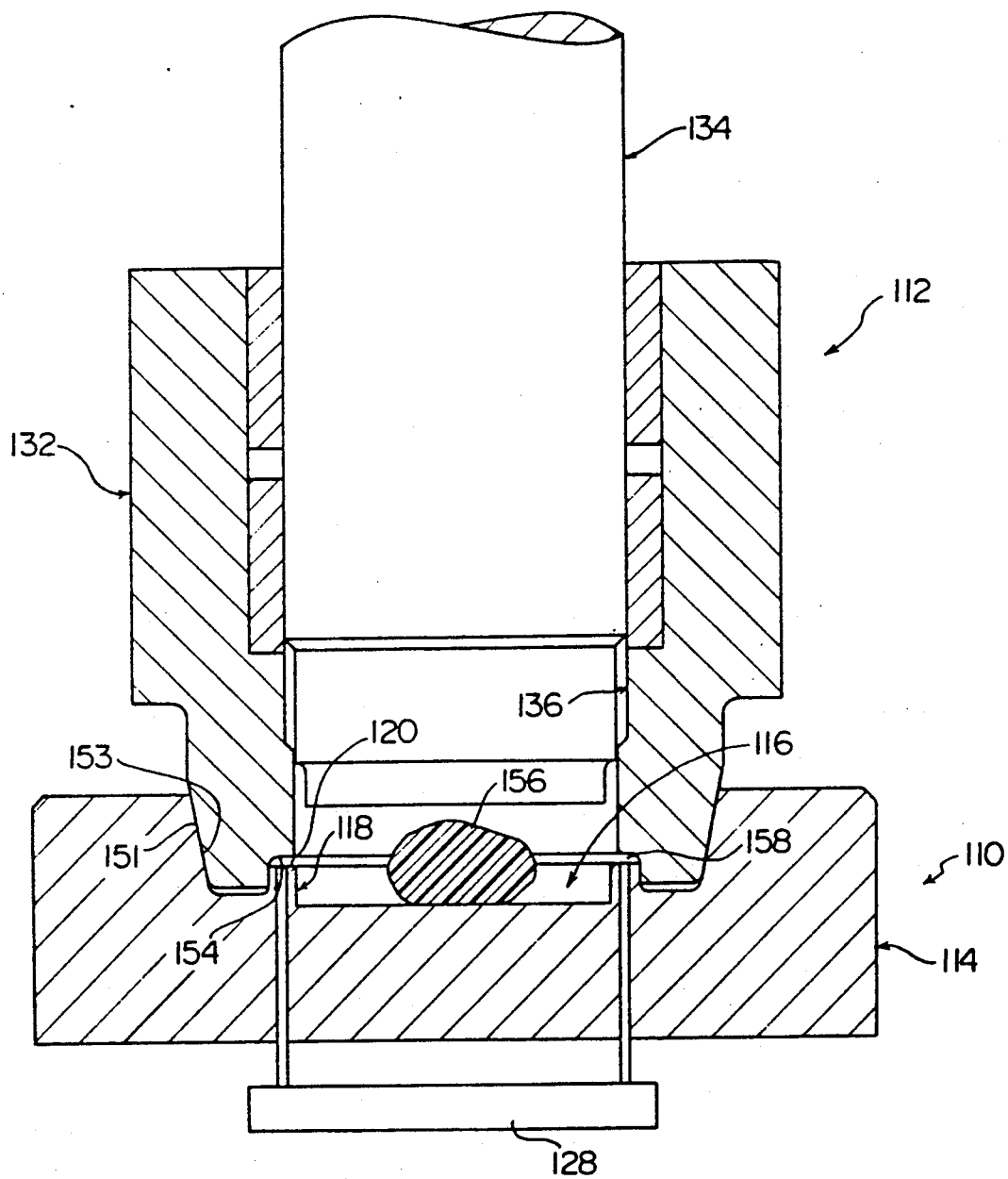

Then, the pre-mold-closing step is carried out to bring the female mold means 110 and the male mold means 112 into the state shown in FIG. 8. Specifically, the outside member 132 in the male means 112 is lowered to the lower limit position shown in FIG. 8. At the lower limit position, the lower part 151 of the outer circumferential surface of the outside member 132 abuts against the circumferential surface 153 of the depression 116 of the stationary member 114 to thereby hamper further lowering of the outside member 132. It will be easily understood from FIG. 8 that when this pre-mold-closing step is performed, that portion 158 of the mold space which defines the flange 108 of the closure 102 is formed by the upper surface 120 of the annular protrusion 118 of the stationary member 114 in the female mold means 110, the shoulder surface 164 of the outside member 132 in the male mold means 112 and the upper portion of the circumferential surface of the lower end portion 144 (FIG. 7) of the opening 136. Preferably, the mold closing pressure between the stationary member 114 in the female mold means 110 and the outside member 132 in the male mold means 112 is slightly higher than the compressing pressure to be described below.

As will be readily understood from a comparison of FIG. 7 with FIG. 8, in the pre-mold-closing step in the illustrated embodiment, the inside member 134 in the male mold means 112 is also lowered, but it is important that the inside member 134 should not be lowered to a position at which it exerts a substantially compressing action on the synthetic resin material 156.

In the illustrated embodiment, the synthetic resin material 156 is fed into the depression 116 of the stationary member 114 in the female mold means 110 (FIG. 7) and then the pre-mold-closing step is carried out (FIG. 8). If desired, the synthetic resin material 156 can be fed after the pre-mold-closing step has been completed.

Subsequently, the compressing step is carried out. Specifically, the inside member 134 in the male mold means 112 is lowered by a required compressing pressure to compression-mold the synthetic resin material 156. As a result, the top wall 104 and rising wall 106 of the closure 102 are formed by a mold space portion defined between the stationary member 114 in the female mold means 110 and the inside member 134 in the male mold means 112. Furthermore, the synthetic resin material 156 flows into the mold space portion 158 (FIG. 8) defined between the stationary member 114 in the female mold means 110 and the outside member 132 in the male mold means 112, and the flange 108 of the closure 102 is formed. Consequently, the closure 102 shown in FIG. 6 can be obtained by compression molding.

The present inventors have experimentally confirmed that when the compression molding is carried out by lowering the outside member 132 and the inside member 134 in the male mold member 112 as a unit without performing the pre-mold-closing step (FIG. 8) and especially when the closure 102 is of a relatively large size, creases tend to occur in the peripheral portion of the flange 108; and that when the site of feeding the synthetic resin material 156 is deviated in a specific direction from the center, the flowing of the synthetic resin material 156 in the opposite direction becomes insufficient, and "burrs" tend to form at the peripheral edge in the above specific direction. It has been confirmed that the closure 102 can be produced by compression molding without the occurrence of defects such as creases in the peripheral portion of the flange 108, etc. even when the site of feeding the synthetic resin material 156 is deviated from the center, if as stated hereinabove the pre-mold-closing step (FIG. 8) is performed by lowering the outside member 132 and then the compression molding step (FIG. 9) is carried out by lowering the inside member 134.

If desired, in the pre-mold-closing step (FIG. 8), the female mold means 110 may be elevated in place of, or in addition to, lowering the outside member 132 in the male mold means 112. Furthermore, in the compression molding step (FIG. 9), the outside member 132 in the male mold means 112 may be elevated together with the female mold means 110 in place of, or in addition to, lowering the inside member 134 in the male mold means 112.

Figure 9:
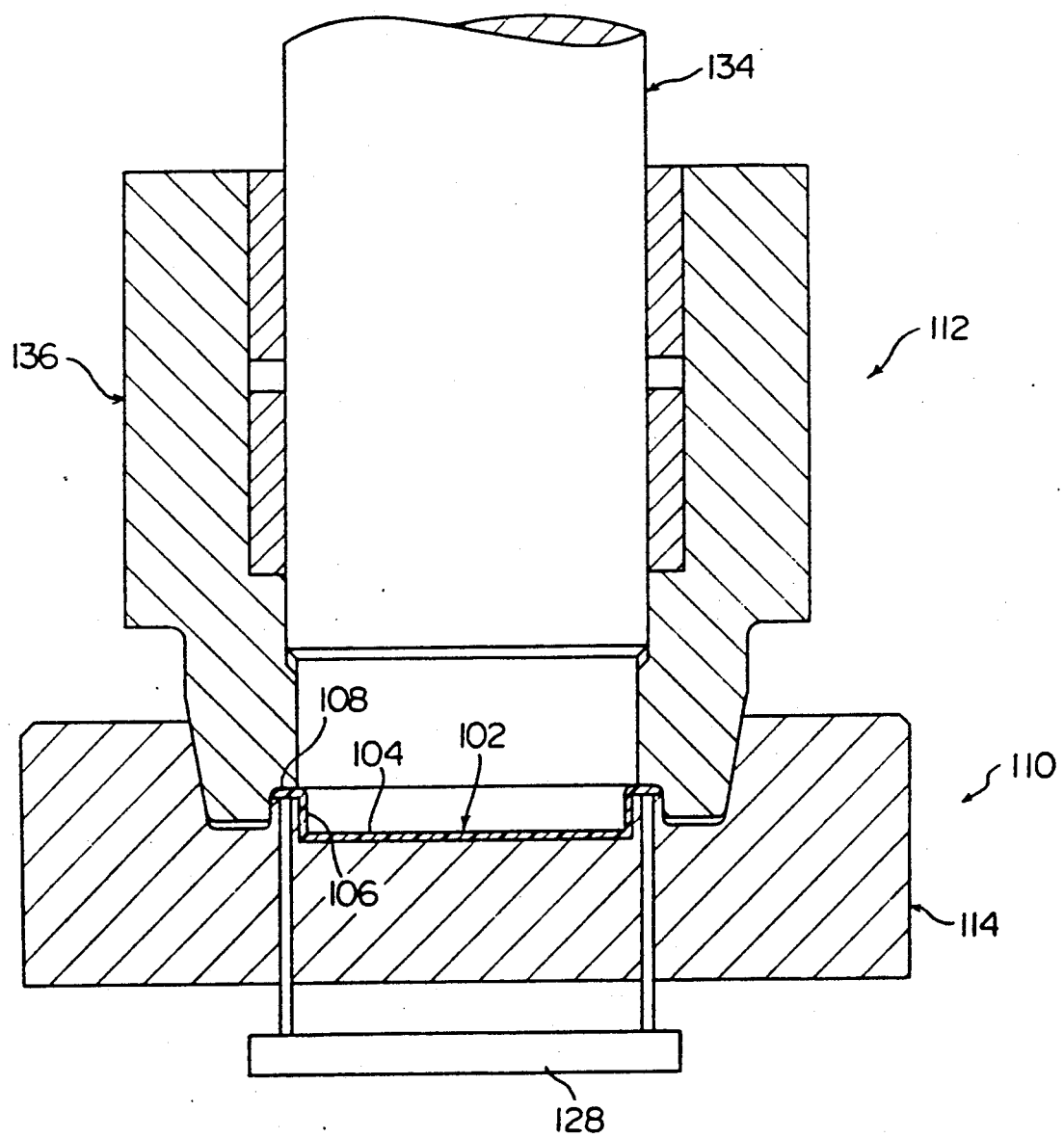

Subsequently, the female mold means 110 and the male mold means 112 are maintained in the state shown in FIG. 9, and the molded closure 102 as well as the female mold means 110 and the male mold means 112 are cooled to bring the surface temperature of the mold space defining surface to 20° to 45° C., for example. Conveniently, during this cooling step, a cooling medium such as cooling water is circulated through a circulating passage (not shown) formed in the stationary member 114 in the female mold means 110 and the outside member 132 and the inside member 134 in the male mold means 112.

Thereafter, the female mold means 110 and the male mold means 112 are opened and the molded closure 102 is taken out. With reference to FIG. 10 as well as FIG. 9, in the step of taking out the closure 102, the outside member 132 and the inside member 134 in the male mold means 112 are elevated by a suitable procedure and separated from the molded closure 102. In addition, the movable member 128 in the female mold means 110 is elevated to the position shown in FIG. 10. As a result, the pins 130 implanted in the movable member 128 elevate the closure 102. Thus, the closure 102 is separated from the stationary member 114 of the female mold means 110, and the flange 108 of the molded closure 102 is supported only by the pins 130. Hence, the closure 102 can be taken out by a suitable discharge mechanism (not shown).

EXAMPLE B

A plastic closure was produced by compression molding in the compression molding apparatus described with reference to FIG. 7 by the procedure described above with reference to FIGS. 8 to 10.

Linear low-density polyethylene ("Mitsubishi Polyethy-LL, M30T", a tradename) having a melt flow index of 30 was used as a synthetic resin material, and fed into the compression molding apparatus. The temperature of the resin material was maintained at 200° C., and the compressing pressure in the compressing step was 75 kg/cm$^2$. The amount of the feed resin was 4.5 g.

The resulting closure was free from defects such as creases and had the configuration shown in FIG. 6. The various dimensions of the closure thus obtained by compression molding were as follows (see FIG. 6 also).

Total height H: 7.6 mm
Outside diameter $d_1$: 75.7 mm
Inside diameter $d_2$ of the top wall: 61.2 mm
Thickness $t_1$ of the top wall: 0.9 mm
Thickness $t_2$ of the flange: 1.05 mm When the site of feeding the synthetic resin material was intentionally deviated by various distances from the center of the depression of the stationary member in the female mold means, closures free from defects such as creases could be stably produced by compression molding so long as the fed synthetic resin material was situated inwardly of the annular protrusion.

COMPARATIVE EXAMPLE B

For comparison, the outside member and the inside member in the male mold means were constructed as a one-piece unit and the compression step was carried out without performing the pre-mold-closing step. Otherwise, plastic closures were produced by compression molding in the same way as in Example B.

Considerable creases and burrs were formed in the flange of the closure.

When the amount of the synthetic resin material fed was changed from 4.5 g to 5.0 g by increments of 0.1 g, and the compressing pressure during the compressing step was changed from 75 kg/cm$^2$ to 100 kg/cm$^2$ by increments of 5 kg/cm$^2$, considerable creases and burrs were formed in the resulting closures.

When the site of feeding the synthetic resin material was intentionally deviated by various distances in a specific direction from the center of the depression of the stationary member in the female mold means, some parts in the flange on the opposite side remained unfilled with the synthetic resin, and very excessive burrs occurred in the flange in the above specific direction.

Production of Container Closure (II) by Compression Molding

Figure 11:
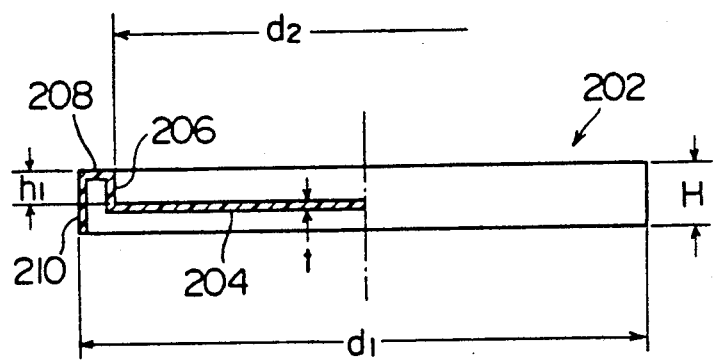
FIG. 11 is a side elevation, partly in section, of another example of a plastic container closure produced by a preferred embodiment of the compression-molding method of this invention.

FIG. 11 shows another example of a plastic container closure to be produced by compression molding. A container closure known per se, which may be made of a suitable synthetic resin such as polyethylene or polyethylene terephthalate and is shown generally at 202, comprises a circular top panel wall 204, a cylindrical rising wall 206 extending upwardly from the peripheral edge of the top panel wall 204, a flange 208 extending outwardly from the upper end of the rising wall 206, and a wall 210 extending downwardly from the peripheral edge of the flange 208.

FIG. 12 shows one example of a compression molding apparatus used to produce the closure 202 shown in FIG. 11 by compression molding. The illustrated compression molding apparatus includes a female mold means, i.e. a lower mold means, shown generally at 212 and a male mold means, i.e. an upper mold means, shown generally at 214.

The female mold means 212 includes a stationary supporting member 216 fixed to a suitable supporting frame (not shown). The stationary supporting member 216 has a disc-shaped bottom portion 218 and a nearly cylindrical side portion 220 extending upwardly from the peripheral edge of the bottom portion 218. The upper portion 222 of the inner circumferential surface of the side portion 220 is of an inverted truncated conical shape inclined inwardly in the downward direction, and the lower portion 224 of the inner circumferential surface of the side portion 220 is cylindrical. A main member 226 is fixed to the bottom portion 218 of the stationary supporting member 216. The main portion 226 has a bottom portion 228 fixed to the stationary supporting member 216 and a truncated conical upper portion 230 extending upwardly from the bottom portion 228. An annular protrusion 234 is formed at the peripheral edge of the upper end surface 232 of the upper portion 230. The female mold means 212 further includes a movable supporting member 236 disposed beneath the stationary supporting member. A plurality of supporting posts (only two of which are shown in FIG. 12) extending upwardly substantially vertically are implanted in the movable supporting member 236 at circumferentially spaced intervals. In correspondence to the supporting posts 238 a plurality of circumferentially spaced through-holes 240 and 242 extending upwardly substantially vertically (FIG. 12 shows only two holes 240 and two holes 242) are formed on the bottom portion 218 of the stationary supporting member 216 and the bottom portion 230 of the main member 226, respectively. The supporting posts 238 extend upwardly through the holes 240 and 242, and a nearly ring-shaped auxiliary member 244 is fixed to the upper ends of the supporting posts 238. The upper end surface 246 of the auxiliary member 244 is substantially horizontal, and the inner circumferential surface of the auxiliary member 244 is of an inverted truncated conical shape corresponding to the truncated conical peripheral surface of the upper portion 230 of the main member 226. The movable supporting member 236 is mounted so as to be free to ascend and descend substantially vertically, and the movable supporting member 236 and the auxiliary member 244 fixed to it via the supporting posts 238 are elevated or lowered substantially vertically by a suitable elevating-lowering mechanism (not shown) (in FIG. 12, the movable supporting member 236 and the auxiliary member 244 are located at the lowermost position). As will be clear from the description given hereinafter, the upper end surface 232 of the upper portion 230 of the main member 226 defines the under surface of the top wall 204 of the closure 202, and the inner circumferential surface 248, the upper end surface 250 and the outer circumferential surface 252 of the annular protrusion 234 respectively define the outside surface of the rising wall 206, the lower surface of the flange 208 and the inside surface of the downwardly extending wall 210 in the closure 202. The inner circumferential edge portion of the upper end surface of the auxiliary member 244 defines the lower end surface of the downwardly extending wall of the closure 202.

The male mold means 214 has a movable outside member 254 and a movable inside member 256. The outside member 254 is nearly cylindrical, and a circular through-opening 258 is formed centrally therein. The upper portion of the through-opening 258 has a relatively large diameter, and its lower portion 262 has a relatively small diameter. Bearing sleeves 264 and 266 are fixed to the upper portion 260. The lower portion 268 of the outer circumferential surface of the outside member 254 is tapered downwardly and corresponds to the upper portion 222 of the inner circumferential surface of the side portion 220 of the stationary supporting member 216 in the female means 212. The inside member 256 is nearly cylindrical, and includes an upper portion 270, an intermediate small-diameter portion 272, a cylindrical lower portion 274 having a diameter smaller than the upper portion 270 but larger than the small-diameter portion 272, and a circular projecting portion 276 formed in the lower end surface of the lower portion 274. The outside diameter of the upper portion 270 corresponds to the inside diameter of the bearing sleeves 264 and 266, and the outside diameter of the lower portion 274, to the inside diameter of the lower portion 262 of the through-opening 258 in the outside member 254. The outside member 254 is mounted so as to be free to ascend and descend substantially vertically, and is elevated or lowered by a suitable elevating-lowering mechanism (not shown). As will become apparent from the description given hereinafter, the substantially horizontal lower end surface 278 of the projecting portion 276 of the inside member 256 defines the upper surface of the top panel wall 204 of the closure 202; the outer circumferential surface 280 of the projecting portion 276 defines the inner surface of the rising wall 206 of the closure 202; the substantially horizontal annular lower end surface 282 of the lower portion 274 defines the upper surface of the flange 208 of the closure; and the lower end portion of the lower portion 262 of the through-opening 258 in the outside member 254 defines the outer surface of the downwardly extending wall 210 of the closure 202.

The closure 202 shown in FIG. 11 is produced by compression molding in the compression molding apparatus including the female mold means 212 and the male mold means 214 described above by the following procedure.

Before the starting of the compression molding, the female mold means 212 and the male mold means 214 are positioned in the state shown in FIG. 12. Preferably, the main member 226 and the auxiliary member 244 in the female mold means 212 and the outside member 254 and the inside member 256 in the male mold means 214 are heated (or cooled) by a suitable method, for example by circulating a heating (or cooling) medium through a circulating passage (not shown) formed in these members 226, 244, 254 and 256 so that the mold space defining surfaces of these members 226, 244, 254 and 256 attain a temperature of about 20° to 45° C. (such heating or cooling may be carried out only before the starting of the first compression molding cycle, and when the compression molding is repeated, the members 226, 244, 254 and 256 already attain the required temperature upon the termination of the previous compression molding cycle, as will be clearly seen from the description given hereinafter).

Then, a predetermined amount of a synthetic resin material 284 in the heat-softened state is fed into the central part of the upper end surface 232 of the main member 226 in the female mold means 212. The feeding of the synthetic resin material 284 may be conveniently carried out by using the synthetic resin feeding apparatus to be described in detail hereinafter.

Figure 13:
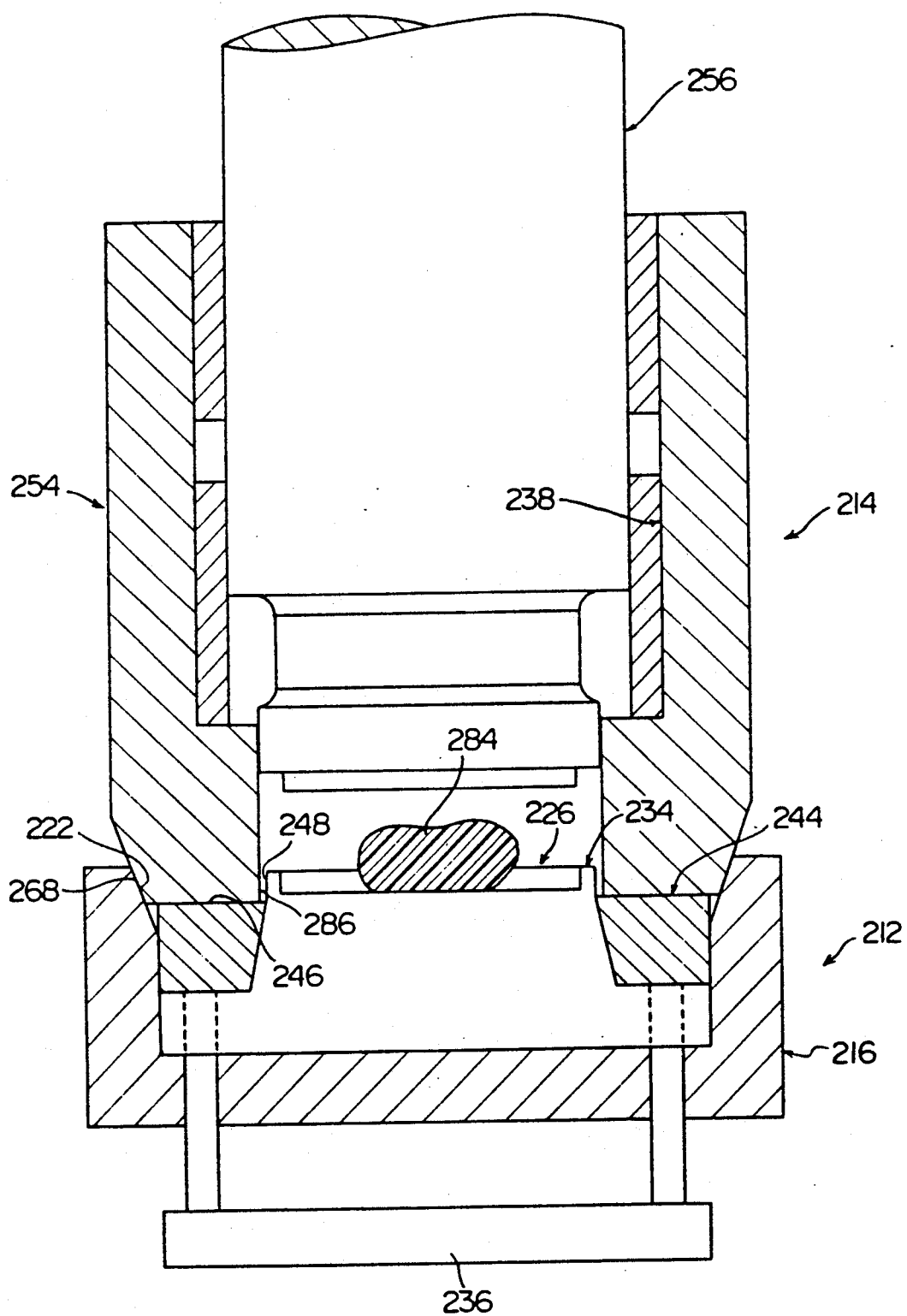

Then, a pre-mold-closing step of bringing the female mold means 212 and the male mold means 214 into the state shown in FIG. 13 is carried out. Specifically, the outside member 254 in the female mold means 21 is lowered to the lower limit position shown in FIG. 13. At the lower limit position, the lower end surface of the outside member 254 abuts against the upper end surface 246 of the auxiliary member 244 in the female mold means 212 and the lower portion 268 of the outer circumferential surface of the outside member 254 abuts against the upper portion 222 of the inner circumferential surface of the side portion 220 of the stationary supporting member 216, whereby further lowering of the outside member 254 is hampered. It will be easily understood from FIG. 13 that when this pre-mold-closing step is carried out, that portion 286 of the mold space which defines the downwardly extending wall 210 of the closure 202 is formed by the outer circumferential surface 248 of the annular protrusion 234 of the main member 226 in the female mold means 212, the inner circumferential edge portion of the upper end surface 246 of the auxiliary member 244, and the lower end portion of the lower portion 262 (FIG. 12) of the through-opening 258 of the outside member 254 in the male mold means 214. The mold closing force between the auxiliary member 244 in the female mold means 212 and the outside member 254 in the male mold means 214 can be very small.

As can be easily understood from a comparison of FIG. 12 with FIG. 13, in the pre-mold-closing step in the illustrated embodiment, the inside member 256 in the male mold means 214 is also lowered, but it is important that the inside member 256 should not be lowered to a position at which it exerts a substantial compressing action on the synthetic resin material 284.

In the illustrated embodiment, the synthetic resin material 284 is first fed into the main member 226 in the female mold means 212 (FIG. 12), and then the pre-mold-closing step is carried out (FIG. 13). If desired, the synthetic resin material 284 may be fed after the pre-mold-closing step has been carried out.

Figure 14:
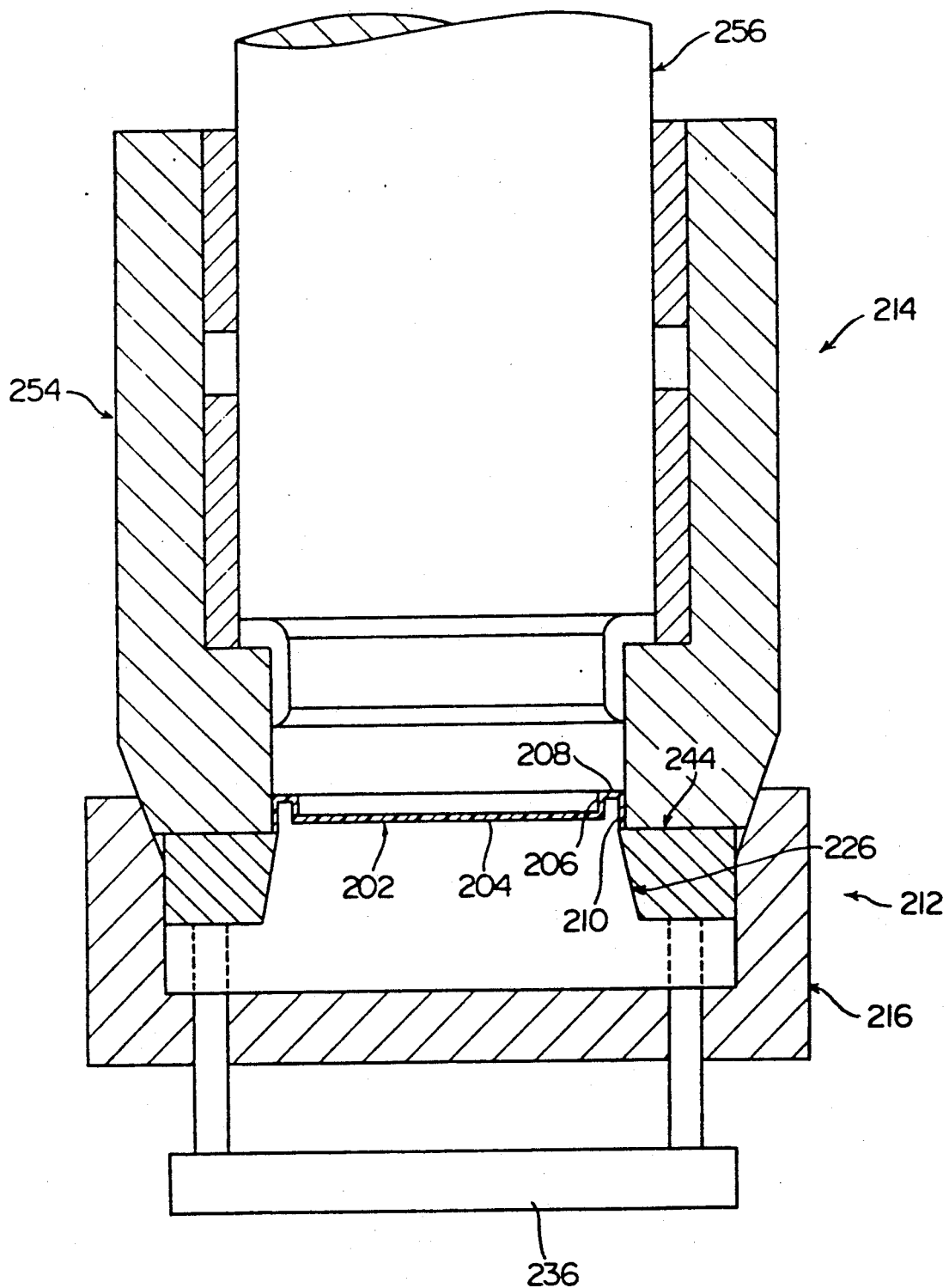

Thereafter, the compressing step is carried out. Specifically, as shown in FIG. 14, the inside member 256 in the male mold means 214 is lowered by a required compressing pressure to compression-mold the synthetic resin material 284. As a result, the top panel wall 204, the rising wall 206 and the flange 208 are formed by the mold space portion defined between the main member 226 in the female mold means 212 and the inside member 256 in the male mold means 214. Furthermore, the synthetic resin material 284 flows into the mold space portion 286 (FIG. 13) defined between the main member 226 and the auxiliary member 244 in the female mold means 212 and the outside member 254 in the male mold means 214 to form the downwardly extending wall 210 of the closure 202. Thus, the closure 202 shown in FIG. 11 can be obtained by compression molding.

The present inventors have experimentally confirmed that when the compression molding is carried out by lowering the outside member 254 and the inside member 256 in the male mold means 214 as a unit without performing the pre-mold-closing step (FIG. 13) and especially when the closure 202 is of a relatively large size, creases tend to occur in the outside surface of the downwardly extending wall 210; and that when the site of feeding the synthetic resin material 284 is deviated in a specific direction from the center, the flowing of the resin material 284 in the opposite direction becomes insufficient, and "burrs" tend to form at the peripheral edge in the above specific direction. It has been confirmed that the closure 202 can be produced by compression molding without the occurrence of defects such as creases on the outside surface of the downwardly extending wall 210 even when the site of feeding the synthetic resin material 284 is deviated from the center, if as stated hereinabove, the pre-mold-closing step (FIG. 13) is first carried out by lowering the outside member 254 and then the compression molding step (FIG. 14) is carried out by lowering the inside member 256.

If desired, in the pre-mold-closing step (FIG. 13), the female mold means 212 may be elevated in place of, or in addition to, lowering the outside member 254 in the male mold means 214. Furthermore, in the compression molding step (FIG. 14), the outside member 254 in the male mold means 214 may be elevated together with the female mold means 212 in place of, or in addition to, lowering the inside member 256 in the male mold means 214.

Subsequently, the female mold means 212 and the male mold means 214 are maintained in the state shown in FIG. 14, and the molded closure 202 as well as the female mold means 212 and the male mold means 214 are cooled to bring the surface temperature of the mold space defining surface to 20° to 45° C., for example. Conveniently, during this cooling step, a cooling medium such as cooling water may be circulated though a circulating passage (not shown) formed in the main member 226 and the auxiliary member 244 in the female mold means 212 and the outside member 254 and the inside member 256 in the male mold means 214.

Thereafter, the female mold means 212 and the male mold means 214 are opened and the molded closure 202 is taken out. With reference to FIG. 15 as well as FIG. 14, in the step of taking out the closure 202, the outside member 254 and the inside member 256 in the male mold means 214 are elevated by a suitable procedure and separated from the molded closure 202. In addition, the movable supporting member 236 in the female mold means 212 and the auxiliary member 244 fixed to it are elevated to the position shown in FIG. 15. Consequently, the closure 202 is elevated by the auxiliary member 244 and separated from the main member 226 in the female mold means 212, and only the lower end of the downwardly extending wall 210 of the molded closure 202 remains supported by the auxiliary member 244. Hence, the molded closure 202 can be taken out by a suitable discharge mechanism (not shown).

EXAMPLE C

A plastic closure of the type shown in FIG. 11 was produced by compression molding in the compression molding apparatus described with reference to FIG. 12 by the procedure described with reference to FIGS. 13 to 15.

Linear low-density polyethylene ("Mitsubishi Polyethy-LL, M80V" sold by Mitsubishi Petrochemical Industries, Ltd.) having a melt flow index of 50 was used as a synthetic resin material. The temperature of the synthetic resin material fed into the compression molding apparatus was 240° C., and the compressing pressure during the compression was 54 kg/cm$^2$. The weight of the synthetic resin material fed was 4.7 g.

The resulting closure was free from defects such as creases and had the configuration shown in FIG. 11. The molded closure had the following dimensions (see FIG. 11 also).

Total height H: 8 mm
Outside diameter $d_1$: 74.8 mm
Inside diameter $d_2$ of the top panel wall: 64.6 mm
Height $h_1$ of the top panel wall: 5.2 mm
Thickness t of the top panel wall: 0.7 mm When the site of feeding the synthetic resin material was intentionally deviated by various distances from the center of the upper end surface of the main member in the female mold means, closures free from defects such as creases could be stably produced by compression molding so long as the fed synthetic resin material was located on the upper end surface of the main member in the female means (i.e., inwardly of the annular protrusion).

COMPARATIVE EXAMPLE C

For comparison, the outside member and the inside member in the male mold means were constructed as a one-piece unit, and the compression molding was carried out without performing the pre-mold-closing step. Otherwise, a plastic closure was produced by compression molding in the same way as in Example C.

As a result, considerable creases were formed on the outside surface of the downwardly extending wall of the closure, and considerable burrs were formed in the lower end of the downwardly extending wall.

When the weight of the synthetic resin material fed was changed from 4.6 g to 5.5 g by increments of 0.1 g, and the compressing pressure was changed from 55 kg/cm$^2$ to 100 kg/cm$^2$ by increments of 5 kg/cm$^2$, considerable creases were formed on the outside surface of the downwardly extending wall an considerable burrs were formed in the lower end of the downwardly extending wall in the resulting closures.

When the site of feeding the synthetic resin material was intentionally deviated by various distances in a specific direction from the center of the upper end surface of the main member in the female mold means, some parts in the downwardly extending wall on the opposite side remained unfilled with the synthetic resin, and very excessive burrs were formed at the lower end of the downwardly extending wall in the above specific direction. When the temperature of the synthetic resin material fed was lowered to 200° C., the burrs were decreased, but more parts of the downwardly extending wall remained unfilled with the synthetic resin.

SYNTHETIC RESIN FEEDING APPARATUS

Now, a synthetic resin feeding apparatus will be described which can be conveniently used for feeding a required amount of the synthetic resin material 74, 156 or 284 in the heat-melted state into a given portion of the compression molding apparatus for the production of the container 2 or the closure 102 or 202 described above.

Figure 16:
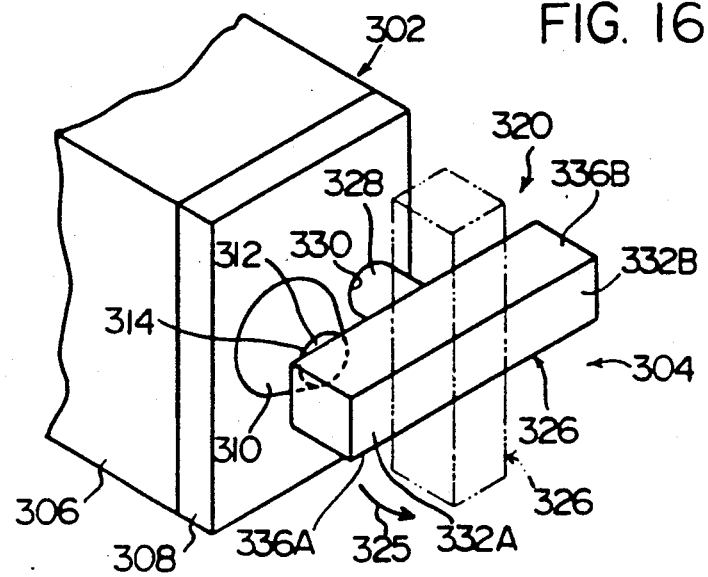
Figure 17:
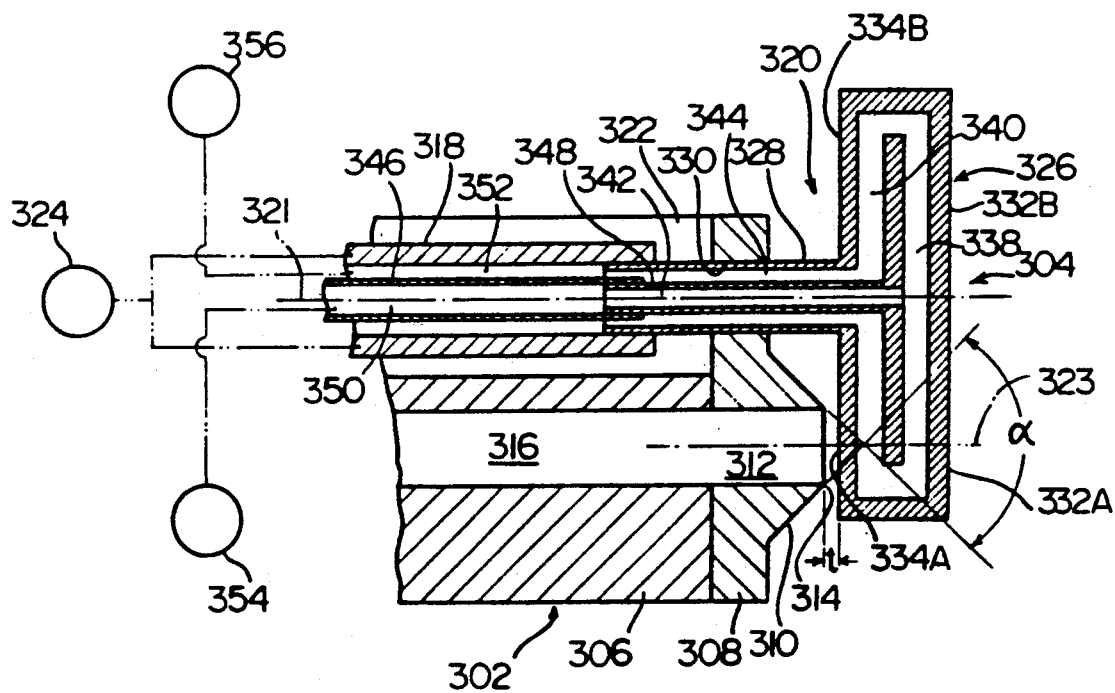
FIG. 17 is a sectional view of the synthetic resin feeding apparatus shown in FIG. 16.

With reference to FIGS. 16 and 17, the resin feeding apparatus illustrated has an extruder 302 and a cutting tool assembly 304 (FIGS. 16 and 17 show only the front portions of the extruder 302 and the cutting tool assembly 304).

The extruder 302 comprises an extrusion block 306 connected to a main portion (not shown) having a rotating screw mechanism and an extrusion plate 308 fixed to the front surface of the extrusion block 306. It is important that a tapered portion 310 be formed at the front surface of the extrusion plate 308. The tapered portion 310 may be of a suitable shape such as a truncated pyramid, but is preferably truncated-conical as shown in the drawings. Conveniently, the tapered portion 310 has a tapering angle $\alpha$ (FIG. 17) of 80° to 100°. An extrusion opening 312 conveniently having a circular cross-sectional shape is formed in the extrusion plate 308. It is important that the front end of the extrusion opening 312 be opened at the front end surface of the tapered portion 310. In the illustrated embodiment, the front end of the extrusion opening 312 is opened over substantially the entire area of the front end surface of the tapered portion 310. In other words, the sectional shape of the extrusion opening 312 at its front end substantially conforms to the sectional shape of the front end surface of the tapered portion 310. Accordingly, at the front end of the extrusion opening 312, a circular sharp knife edge 314 surrounding it is defined. An extrusion passage 316 conveniently having substantially the same cross-sectional shape as the cross-sectional shape of the extrusion opening 312 is formed in the extrusion block 306. The downstream end of the extrusion passage 316 is directly connected to the rear end of the extrusion opening 312, and the upstream end of the extrusion passage 316 is caused to communicate with a discharge opening of the main portion (not shown) of the extruder 302. Accordingly, the heat-melted resin extruded from the discharge opening of the main portion of the extruder 302 is conducted to the extrusion opening 312 through the extrusion passage, and extruded forwardly from the front end of the extrusion opening 312.

With reference mainly to FIG. 17, the illustrated cutting tool assembly 304 includes a rotating shaft 318 (only its front end portion is shown in FIG. 17) and a rotary cutting tool 320 fixed to the front end of the rotating shaft 318. The rotating shaft 318 is of a hollow cylinder and is rotatably supported by a suitable supporting means (not shown) such that its central axis 321 of rotation runs substantially parallel to the central axis 323 of the extrusion opening 312. A suitable cut 322 is formed in one side portion of the extrusion block 306, and the front end portion of the rotating shaft 318 is positioned within the cut 322. A driving source which may be an electric motor is connected to the rotating shaft 318, and the rotating shaft 318 and the rotary cutting tool 320 fixed to it are rotated in the direction shown by an arrow 325 (FIG. 16) by the driving source 324. The rotary cutting tool 320 has a main portion 326 which may be rectangular and a shaft portion 328 extending rearwardly from the rear surface of the main portion 326. The shaft portion 328 is of a hollow cylindrical shape. It extends rearwardly through a circular opening 330 formed in the extrusion plate 308, and the rear end of the shaft portion 328 is fixed to the front end of the rotating shaft 318. Thus, the rotary cutting tool 320 is rotatably supported in place. The main portion 326 in the illustrated rotary cutting tool 320 is symmetrical with respect to the central axis of rotation, and has two cutting sections 332A and 332B. The rear surfaces of the cutting sections 332A and 332B, i.e. flanks 334A and 334B, are preferably positioned at some distance of about 0.5 to 1.0 mm althouth they may be caused to abut against the front end surface of the tapered portion 310 in the extrusion plate 308. The angle of relief, $\gamma$, formed between the flanks 334A and 334B of the cutting sections 332A and 332B and the front end surface of the tapered portion 310 may be about 0 to 45 degrees (in the illustrated embodiment, the angle of relief, $\gamma$, is substantially zero, and therefore the flanks 334A and 334B extend substantially parallel to the front end surface of the tapered portion 310). On the other hand, the rake angle, $\beta$, (FIG. 18-B) formed between the front surfaces in the rotating direction of the cutting sections 332A and 332B, namely rake surfaces 336A and 336B (FIGS. 16 and 18-B) and a plane tangent to the front end surface of the tapered portion 310 is desirably 80 to 145 degrees, preferably about 100 degrees, in view of the experimental results obtained by the present inventors. If the rake angle $\beta$ is too small, the ability of the cutting tool to cut the synthetic resin tends to be reduced, and the cut resin tends to adhere to the surface of the extrusion plate 308. On the other hand, if the rake angle $\beta$ is too large, the separability of the cut resin from the rake surfaces 336A and 336B tends to be reduced.

Again, with reference to FIG. 17, the main portion 326 of the cutting tool 320 has formed therein a front cavity 338 and a rear cavity 340 communicating with each other at their top and bottom portions (the cavities 338 and 340 may be formed by subjecting the main portion 326 to a required machining operation from its top and bottom surfaces and thereafter closing the top and bottom openings formed by machining). The shaft portion 328 of the rotary cutting tool 320 has formed therein two flow passages, that is, a central introduction flow passage 324 having a circular cross section and a discharge flow passage having an annular cross section. As clearly shown in FIG. 17, the introduction flow passage 342 communicates with the front cavity 338, and the discharge flow passage 344, with the rear cavity 340. A pipe 346 is concentrically disposed within the rotating shaft 318. The front end of the pipe 346 is fixed to the rear end of an annular wall 348 existing between the introduction flow passage 342 and the discharge flow passage 344 in the shaft portion 328 of the rotary cutting tool 320. As a result, a flow passage 350 defined within the pipe 346 communicates with the introduction flow passage 342, and a flow passage 352 defined between the outer circumferential surface of the pipe 346 and the inner circumferential surface of the rotating shaft 318 communicates with the discharge flow passage 344. The flow passage 350 is connected to a cooling medium supply source 354 by a suitable connecting means (not shown), and the flow passage 352 is connected to a cooling medium discharge means 356 by a suitable connecting means (not shown). A cooling medium such as cooling water supplied from the supply source 354 flows into the front cavity 338 via the flow passages 350 and 342, then further into the rear cavity 340, and thereafter sent to the discharge means 356. Consequently, the rotary cutting tool 320, particularly the main portion 326, is properly cooled so that, for example, the rake surfaces 336A and 336B of the cutting sections 332A and 332B of the main portion 326 attain a temperature of not more than 70° C.

The operation of the resin feeding apparatus described above will now be described. As shown in FIG. 18-A, when a predetermined amount of the resin R in the heat-melted state is extruded through the extrusion opening 312 formed in the extrusion plate 308, one of the cutting sections 332A and 332B of the main portion 326 of the rotary cutting tool 320 moves downwardly from above across the extrusion opening 312. As a result, as shown in FIGS. 18-B and 18-C, the rake surface 336A (or 336B) of the cutting section 332A (or 332B) and the sharp knife edge 314 existing at the front end surface of the tapered portion 310 of the extrusion plate 308 act cooperatively to cut the extruded resin R. Then, as shown in FIG. 18-D, the cut resin R separates from the rake surface 336A (or 336) and falls downwardly and is thereafter fed into a required site, that is, a compression mold in the open state (not shown). Thereafter, when a required amount of the resin R is extruded through the extrusion opening 312, the other of the cutting sections 332A and 332B in the main portion 326 of the rotary cutting tool 320 moves downwardly from above across the extrusion opening 312, and in the same way as described above, the resin R is cut and allowed to fall onto the required site. Thus, the cutting sections 332A and 332B of the main portion 326 of the rotary cutting tool act alternately on the resin extruded from the extrusion opening 312 to cut the resin R successively and allow the cut resin masses to fall onto the required site. The rotary cutting tool 320 may be rotated continuously, or intermittently through a rotating angle of 180 degrees. A rotary cutting tool having a single cutting section (332A or 332B) may be rotated intermittently through a rotating angle of 360 degrees.

The resin feeding apparatus of the invention described above is of the unique structure in which the tapered portion 310 is formed on the extrusion plate 308 and the extrusion opening 312 opens at the front end surface of the tapered portion 310. In the prior art, when the resin to be extruded has a relatively low viscosity or is to be extruded in a relatively large amount, it is extremely difficult, if not impossible, to cut and drop it properly. By using the apparatus constructed in accordance with this invention, however, even such a resin can be cut well and dropped into the required site. In the illustrated embodiment, the following fact should also be noted. It has previously been thought to be important to cause the cutting section of the rotary cutting tool to abut elastically against the front end surface of the extrusion plate. In the resin feeding apparatus of this invention, it is preferred to provide some space between the cutting sections 332A and 332B of the main portion 326 of the rotary cutting tool 320 and the front end surface of the tapered portion 310 of the extrusion plate 308 rather than to cause the cutting sections 332A and 332B to abut against the front end surface of the tapered portion 310. The provision of the space makes it possible to completely avoid friction caused by physical contact between the cutting sections 332A and 332B with the extrusion plate 308, and the life of the apparatus can be much prolonged.

Figure 19:
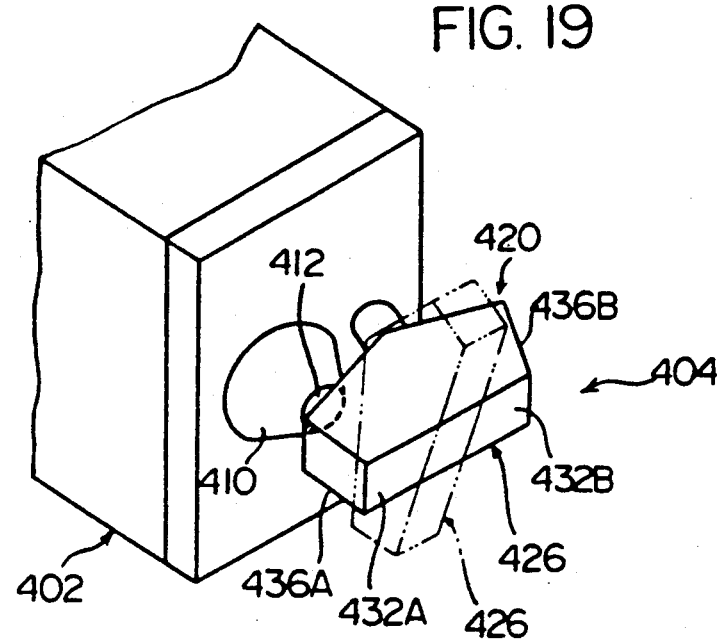
FIG. 19 is a partial perspective view showing the principal parts of a modified example of the synthetic resin feeding apparatus constructed in accordance with this invention.
Figure 20:
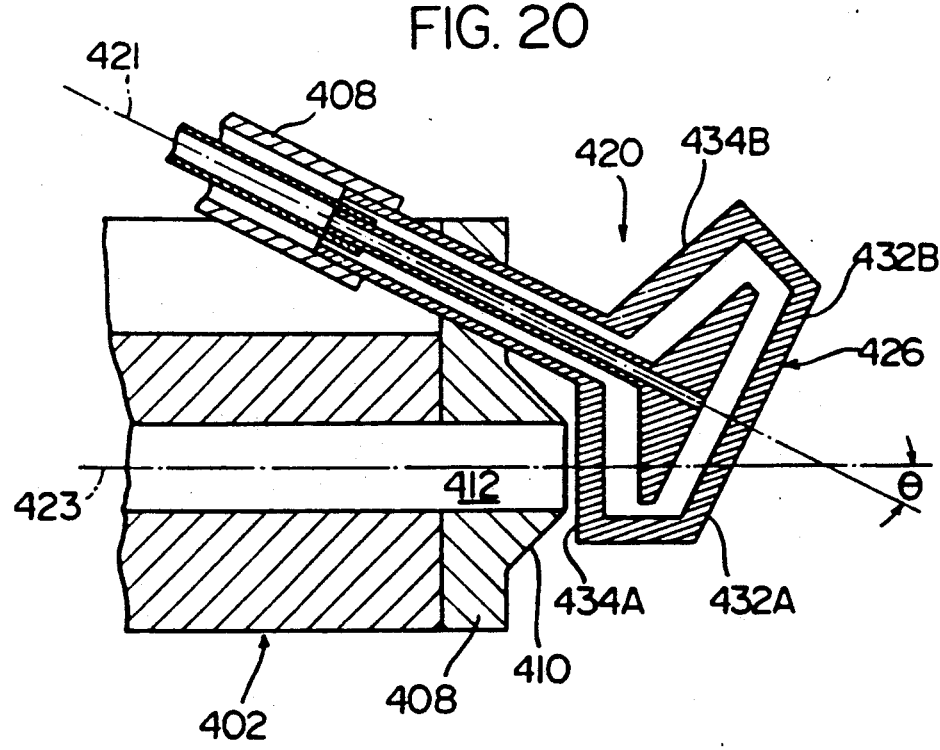
FIG. 20 is a sectional view of the synthetic resin feeding apparatus of FIG. 19.

FIGS. 19 and 20 show a modified embodiment of the resin feeding apparatus constructed in accordance with this invention. In the modified embodiment, the axis 418 of rotation in a cutting tool assembly 404 and the central axis 421 of rotation of a rotary cutting tool 420 are inclined in a predetermined direction to the central axis 423 of an extrusion opening 412 in an extruder 402. The angle of inclination, $\theta$, is preferably about 20 to 40 degrees. Incident to the inclination of the central axis 421 of rotation, the rear surfaces of cutting sections 432A and 432B of a main portion 426 of the rotary cutting tool 420, namely flanks 434A and 434B, are inclined at a required angle to the central axis 421 of rotation in a predetermined direction so that when crossing the extrusion opening 412, they gradually approach the front end surface of the tapered portion 410 in the extrusion plate 408 and then gradually move away forwardly from the front end surface. In this modified embodiment, a resin extruded from the extrusion opening 412 and cut by the cutting sections 432A or 432B in the main portion 426 of the rotary cutting tool 420 is moved downwardly in a forwardly inclined direction during the cutting operation by being forced by the rake surfaces 436A and 436B of the cutting sections 432A and 432B. Hence, on separation from the cutting sections 432A or 432B, the resin falls in a forwardly inclined direction. When the resin feeding apparatus in the modified embodiment is used, the site of feeding the resin may be not immediately below the extrusion opening 412, but deviated downwardly and forwardly. The modified embodiment can be conveniently used when it is impossible to separate the upper mold means and the lower mold means of the compression molding apparatus from each other vertically by a sufficient space for receiving the extrusion plate 408 and the main portion 426 of the rotary cutting tool 420 therebetween. In other words, when the above modified embodiment is used, the compression molding apparatus may be positioned ahead of the extrusion plate 408 and the rotary cutting tool 420. Accordingly, it is not necessary to separate the upper mold means and the lower mold means of the compression molding apparatus from each other vertically by a sufficient distance for receiving the extrusion plate 408 and the rotary cutting tool 420 therebetween. Except the aforesaid structure, the modified embodiment shown in FIGS. 19 and 20 may have the same structure as the embodiment shown in FIGS. 16 and 17.

EXAMPLE D-1

A resin feeding apparatus having the structure shown in FIGS. 16 and 17 and the following sizes and angles of principal parts was built.

Diameter of the front surface of the tapered portion: 10 mm.

Tapering angle $\alpha$ of the tapered portion: 90 degrees.

Diameter of the extrusion opening: 10 mm.

Distance t between the flank of the cutting section and the front end surface of the tapered portion: 0.5 mm.

Rake angle $\beta$ of the cutting section: 100 degrees.

Angle of relief $\gamma$: 30 degrees.

By using this resin feeding apparatus, linear low-density polyethylene (sold by Mitsui Petrochemical Industries, Ltd. under the tradename "ULTZEX 20100J") having a melt flow index of 8 was extruded continuously at a rate of 4 kg/hour while the temperature of the resin was maintained at 230° C. The rotary cutting tool was rotated intermittently through an angle of 180° every other second and the extruded resin was cut by it. At this time, cooling water was circulated through the main portion of the rotary cutting tool to adjust the temperature of the flank of the cutting section of the main portion to 35° C. or less. As a result, cut resin masses (pellets) each weighing 1.1 g could be allowed to fall stably.

EXAMPLE D-2

High-impact polystyrene having a melt flow index of 18 (sold by Mitsui Petrochemical Industries, Ltd. under the tradename "STYRON H8175") was used as the resin to be extruded, and the temperature of the flank of the cutting section of the main portion of the rotary cutting tool was maintained at a temperature of 65° C. or below by circulating cooling water through the main portion. Otherwise, the resin was extruded and cut in the same way as in Example D-1. As a result, cut resin masses each weighing 1.1 g could be allowed to fall stably.

COMPARATIVE EXAMPLE D

For comparison, no tapered portion was formed on the extrusion plate, and the front surface of the extrusion plate was substantially flat. The extrusion opening was opened to this flat front surfce. The main portion of the rotary cutting tool was caused to abut elastically against the flat surface of the extrusion plate. The rake angle $\beta$ of the cutting section in the main portion of the rotary cutting tool was adjusted to 117 degrees. Otherwise, the resin was extruded and cut in the same way as in Example D-1. However, the extruded resin adhered heavily to the flat surface of the extrusion plate and the cutting section of the main portion of the rotary cutting tool. The extruded resin could not be cut into masses and allowed to fall.

What we claim is:

1. A synthetic resin feeding apparatus comprising:

an extruder having an extrusion plate with a front surface and internal walls which form an extrusion opening that extends through the extrusion plate, and a cutting tool disposed for cutting molten synthetic resin extruded from the extrusion opening, the extrusion plate having a tapered portion formed by external walls which taper in a direction outwardly from the front surface of the plate to a foremost edge of the tapered portion where the external walls intersect with the internal walls to form the foremost edge as a knife edge.

2. The apparatus of claim 1 wherein the tapered portion is truncated-conical.

3. The apparatus of claim 1 wherein lines tangent to the outwardly tapering external walls intersect to form a tapering angle $\alpha$ forwardly of the knife edge, the tapering angle $\alpha$ measuring from 80 to 100 degrees.

4. The apparatus of claim 1 wherein the cutting tool is a rotary cutting tool adapted to be rotated.

5. The apparatus of claim 4 wherein the rotary cutting tool has cutting sections with front surfaces which define a rake angle $\beta$ with respect to a plane tangent to points on the knife edge of the tapered portion, the rake angle measuring from 80 to 145 degrees.

6. The apparatus of claim 5 wherein the rake angle $\beta$ is about 100 degrees.

7. The apparatus of claim 4 wherein a rear surface of the rotary cutting tool is spaced from the front end surface of the tapered portion.

8. The apparatus of claim 4 wherein an axis about which the rotary cutting tool rotates is inclined in a predetermined direction with respect to the an axis extending axially through the center of the extrusion opening so that the cutting tool forces cut synthetic resin forwardly from the front end surface of the tapered portion.

9. The apparatus of claim 8 wherein the angle of inclination $\theta$ of the central axis of rotation of the rotary cutting tool to the central axis of the extrusion opening is 20 to 40 degrees.

10. The apparatus of claim 1 wherein a cavity through which to circulate a cooling medium is formed in the cutting tool.

* * * * *